(12) United States Patent
Lee et al.

(10) Patent No.: US 12,720,308 B2
(45) Date of Patent: Aug. 25, 2026

(54) IDENTITY AUTHENTICATION REQUEST METHOD, IDENTITY AUTHENTICATION REQUEST DEVICE, AND IDENTITY AUTHENTICATION SYSTEM

(71) Applicant: GHOST PASS INC., Gwangju (KR)

(72) Inventors: Seon Gwan Lee, Gwangju (KR); Seung Jin Koo, Las Vegas, NV (US)

(73) Assignee: GHOST PASS INC., Gwangju (KR)

( * ) Notice: Subject to any disclaimer, the term of this patent is extended or adjusted under 35 U.S.C. 154(b) by 0 days.

(21) Appl. No.: 18/845,412

(22) PCT Filed: Jan. 17, 2024

(86) PCT No.: PCT/KR2024/000816

§ 371 (c)(1),
(2) Date: Sep. 9, 2024

(87) PCT Pub. No.: WO2024/155089

PCT Pub. Date: Jul. 25, 2024

(65) Prior Publication Data

US 2025/0193662 A1 Jun. 12, 2025

(30) Foreign Application Priority Data

Jan. 17, 2023 (KR) ........................ 10-2023-0006938
Apr. 18, 2023 (KR) ........................ 10-2023-0051002
Jan. 16, 2024 (KR) ........................ 10-2024-0006976

(51) Int. Cl.
*H04W 12/06* (2021.01)
*H04L 9/40* (2022.01)
*H04W 64/00* (2009.01)

(52) U.S. Cl.
CPC ......... *H04W 12/06* (2013.01); *H04L 63/0876* (2013.01); *H04W 64/006* (2013.01)

(58) Field of Classification Search
CPC ................ H04W 12/06; H04W 64/006; H04L 63/0876; H04L 9/3231; G06F 21/32; G06F 21/35; G06F 21/44
See application file for complete search history.

(56) References Cited

U.S. PATENT DOCUMENTS 8,364,963 B2 * 1/2013 Lind ................... H04W 52/283 455/411
8,625,796 B1 * 1/2014 Ben Ayed ............. H04W 12/64 380/258

(Continued)

FOREIGN PATENT DOCUMENTS

CA 3194323 A1 4/2022
JP 2008-189163 8/2008

(Continued)

OTHER PUBLICATIONS

International Search Report issued on Apr. 12, 2024, in International Application No. PCT/KR2024/000816.

(Continued)

*Primary Examiner* — James R Turchen
(74) *Attorney, Agent, or Firm* — PnK IP LLC

(57) ABSTRACT

The present disclosure relates to an identity authentication request method, an identity authentication request device, and an identity authentication system. An identity authentication request method, according to one embodiment of the present disclosure, includes the steps of collecting authentication means data and detecting one or more devices, determining a closest device from among the one or more devices, receiving device identification data from the closest device, and transmitting the authentication means data to a device identified by the device identification data.

8 Claims, 17 Drawing Sheets

(56) References Cited

U.S. PATENT DOCUMENTS

| | | | | |
|---|---|---|---|---|
| 8,965,284 B2 * | 2/2015 | Honkanen | H04W 4/80 455/41.1 |
| 9,075,979 B1 * | 7/2015 | Queru | H04W 64/00 |
| 9,449,165 B2 * | 9/2016 | Potbhare | H04W 12/08 |
| 10,440,570 B2 * | 10/2019 | Knaappila | G06F 21/31 |
| 11,140,157 B1 * | 10/2021 | Xia | H04L 63/0853 |
| 2013/0268687 A1 * | 10/2013 | Schrecker | H04W 12/06 709/229 |
| 2018/0165054 A1 * | 6/2018 | Kang | H04R 3/12 |
| 2022/0058256 A1 * | 2/2022 | Lee | G06F 21/35 |
| 2023/0262058 A1 * | 8/2023 | Dhoot | H04L 63/0884 726/7 |
| 2024/0292217 A1 * | 8/2024 | Shin | H04W 12/065 |

FOREIGN PATENT DOCUMENTS

| | | | |
|---|---|---|---|
| JP | 2014-71707 A | 4/2014 | |
| JP | 2016-025386 | 2/2016 | |
| JP | 2017-027313 | 2/2017 | |
| JP | 2022-71684 A | 5/2022 | |
| KR | 10-2003-0028789 | 4/2003 | |
| KR | 10-2009-0016976 A | 2/2009 | |
| KR | 10-2010-0004570 | 1/2010 | |
| KR | 10-2012-0121148 | 11/2012 | |
| KR | 10-1358565 | 2/2014 | |
| KR | 10-2014-0087232 | 7/2014 | |
| KR | 10-2014-0121222 | 10/2014 | |
| KR | 10-2015-0041722 | 4/2015 | |
| KR | 10-2015-0108009 A | 9/2015 | |
| KR | 10-1719687 | 4/2017 | |
| KR | 10-2017-0060558 | 6/2017 | |
| KR | 10-2156184 | 9/2020 | |
| KR | 10-2022-0056569 A | 5/2022 | |
| WO | WO-2021085799 A1 * | 6/2021 | G06F 21/32 |
| WO | WO-2023059326 A1 * | 4/2023 | H04W 12/63 |

OTHER PUBLICATIONS

European Examination Report dated Dec. 16, 2025, Issued in European Patent Application No. 24 744 869.9—1218.

Office Action dated Mar. 24, 2026, issued in Japanese Patent Application No. 2024-553386.

* cited by examiner

FIG. 8

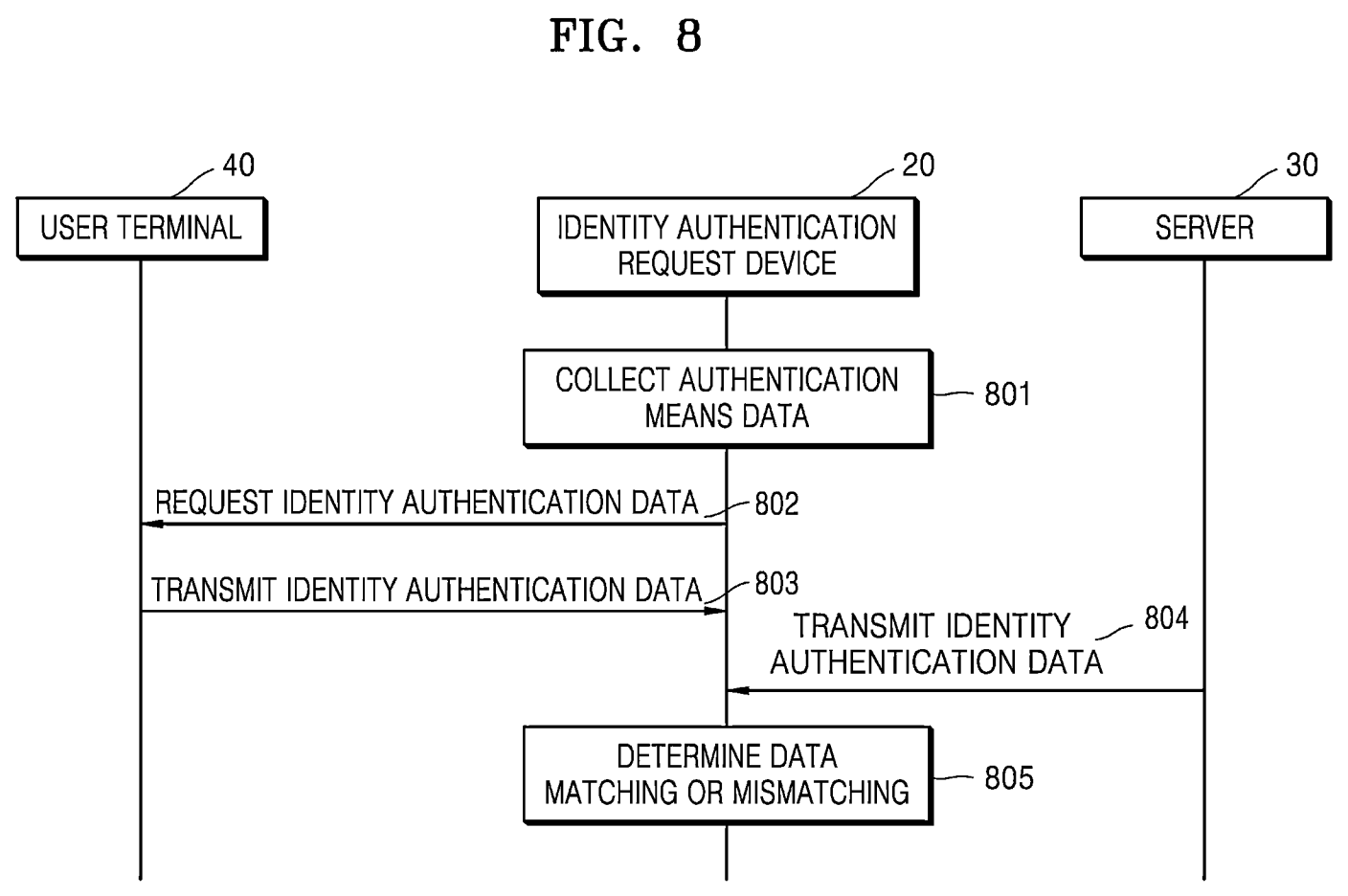

SERVER
30
IDENTITY AUTHENTICATION REQUEST DEVICE
20
USER TERMINAL
40
COLLECT AUTHENTICATION MEANS DATA
801
REQUEST IDENTITY AUTHENTICATION DATA
802
TRANSMIT IDENTITY AUTHENTICATION DATA
803
TRANSMIT IDENTITY AUTHENTICATION DATA
804
DETERMINE DATA MATCHING OR MISMATCHING
805

FIG. 9A

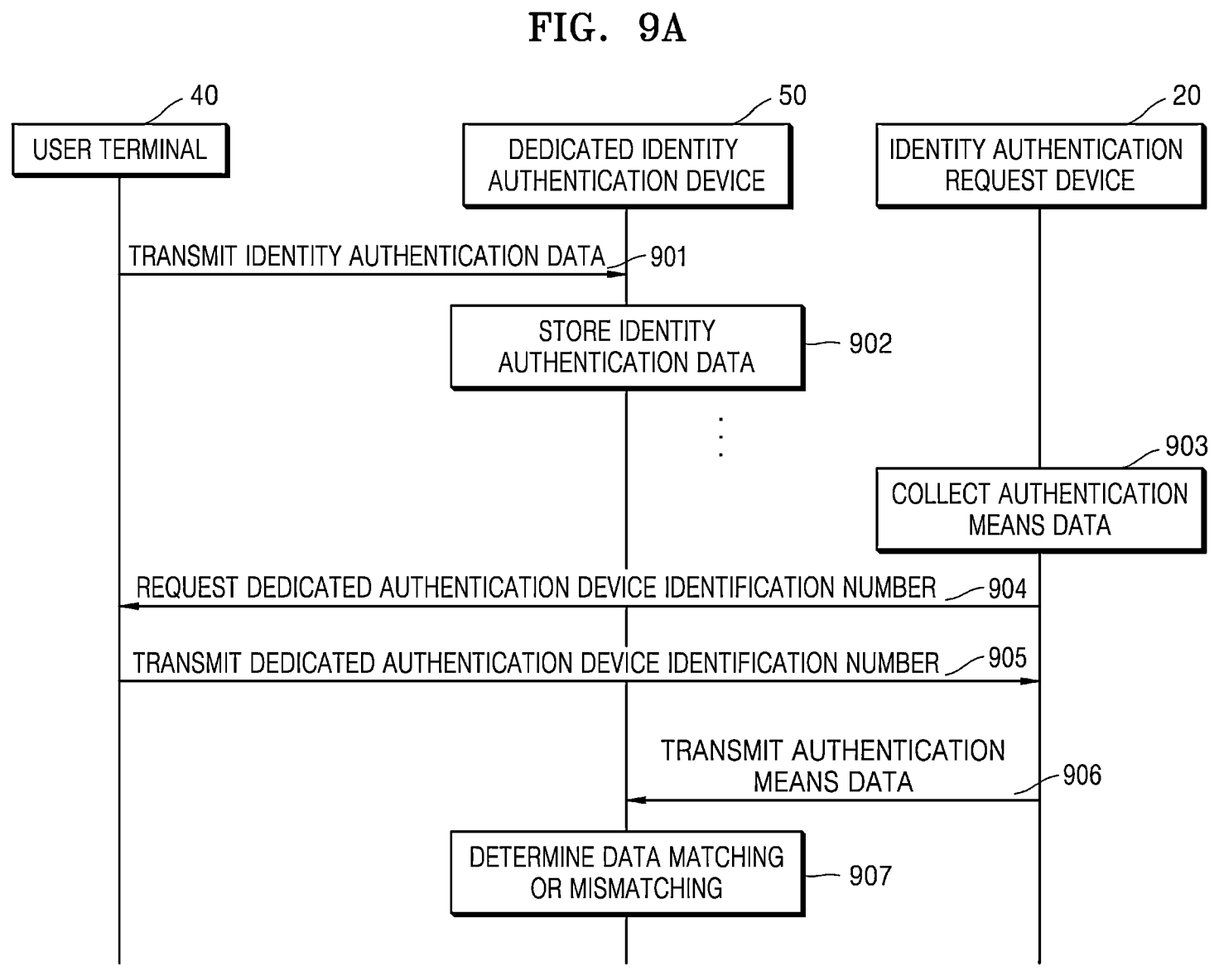

USER TERMINAL
40

DEDICATED IDENTITY AUTHENTICATION DEVICE
50

IDENTITY AUTHENTICATION REQUEST DEVICE
20

TRANSMIT IDENTITY AUTHENTICATION DATA
901

STORE IDENTITY AUTHENTICATION DATA
902

. . .

COLLECT AUTHENTICATION MEANS DATA
903

REQUEST DEDICATED AUTHENTICATION DEVICE IDENTIFICATION NUMBER
904

TRANSMIT DEDICATED AUTHENTICATION DEVICE IDENTIFICATION NUMBER
905

TRANSMIT AUTHENTICATION MEANS DATA
906

DETERMINE DATA MATCHING OR MISMATCHING
907

FIG. 9B

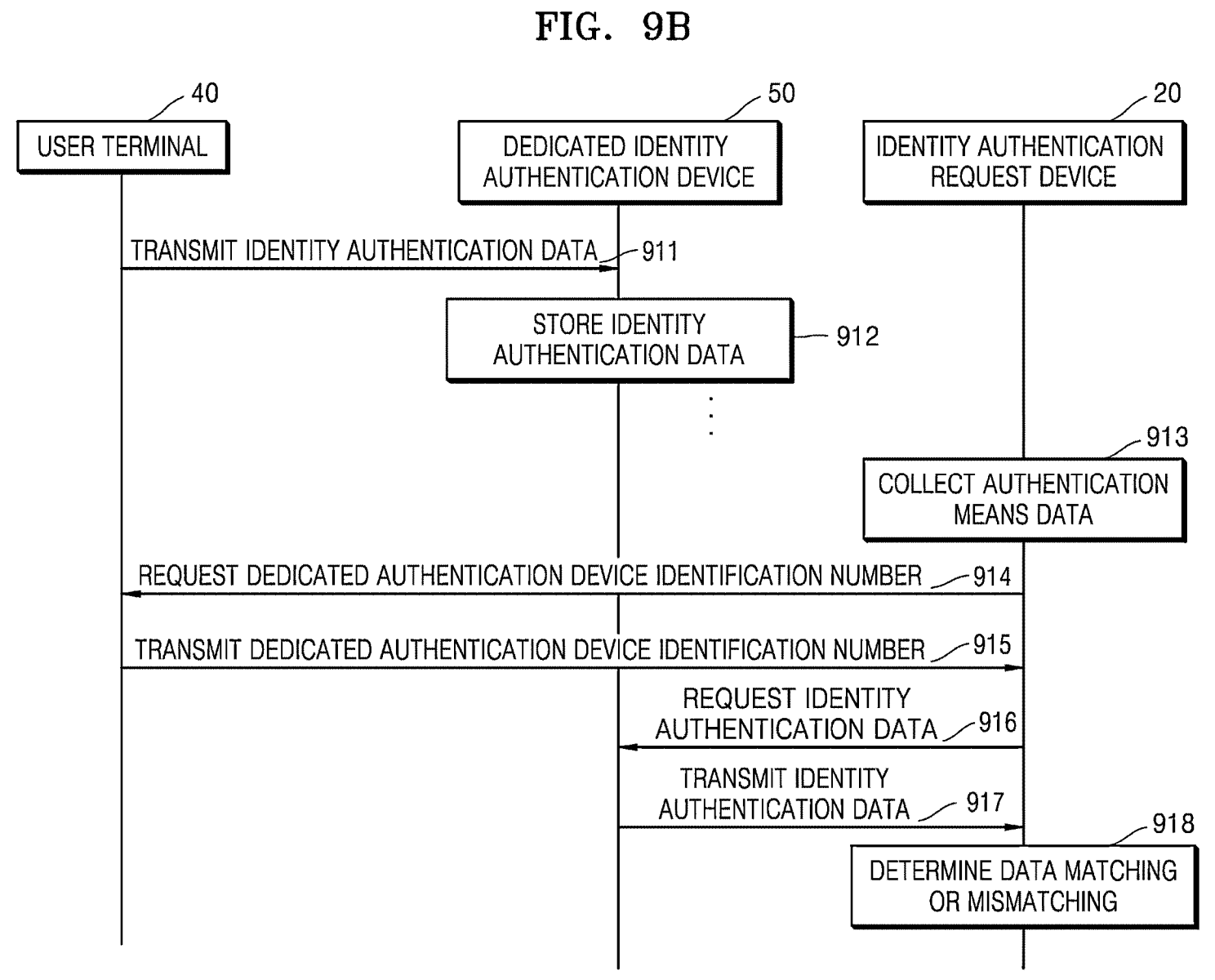

USER TERMINAL
40
DEDICATED IDENTITY AUTHENTICATION DEVICE
50
IDENTITY AUTHENTICATION REQUEST DEVICE
20
TRANSMIT IDENTITY AUTHENTICATION DATA
911
STORE IDENTITY AUTHENTICATION DATA
912
. . .
COLLECT AUTHENTICATION MEANS DATA
913
REQUEST DEDICATED AUTHENTICATION DEVICE IDENTIFICATION NUMBER
914
TRANSMIT DEDICATED AUTHENTICATION DEVICE IDENTIFICATION NUMBER
915
REQUEST IDENTITY AUTHENTICATION DATA
916
TRANSMIT IDENTITY AUTHENTICATION DATA
917
DETERMINE DATA MATCHING OR MISMATCHING
918

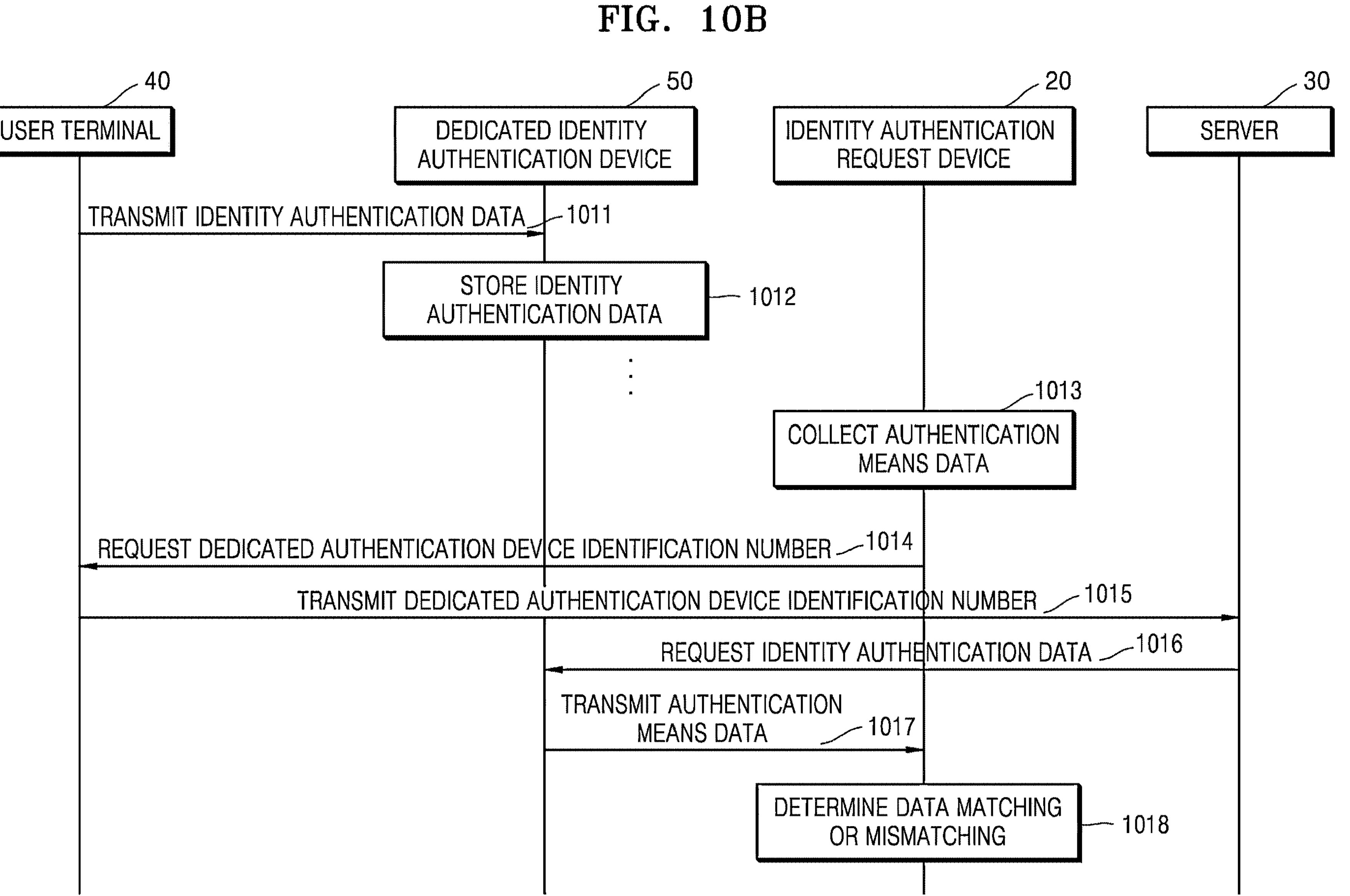
FIG. 10B
40
USER TERMINAL
50
DEDICATED IDENTITY AUTHENTICATION DEVICE
20
IDENTITY AUTHENTICATION REQUEST DEVICE
30
SERVER
TRANSMIT IDENTITY AUTHENTICATION DATA
1011
STORE IDENTITY AUTHENTICATION DATA
1012
COLLECT AUTHENTICATION MEANS DATA
1013
REQUEST DEDICATED AUTHENTICATION DEVICE IDENTIFICATION NUMBER
1014
TRANSMIT DEDICATED AUTHENTICATION DEVICE IDENTIFICATION NUMBER
1015
REQUEST IDENTITY AUTHENTICATION DATA
1016
TRANSMIT AUTHENTICATION MEANS DATA
1017
DETERMINE DATA MATCHING OR MISMATCHING
1018

IDENTITY AUTHENTICATION REQUEST METHOD, IDENTITY AUTHENTICATION REQUEST DEVICE, AND IDENTITY AUTHENTICATION SYSTEM

CROSS REFERENCE TO RELATED APPLICATIONS

This application is a National Stage Entry of International Patent Application No. PCT/KR2024/000816, filed on Jan. 17, 2024, which claims priority from and the benefit of Korean Patent Application No. 10-2023-0006938, filed on Jan. 17, 2023, Korean Patent Application No. 10-2023-0051002, filed on Apr. 18, 2023, and Korean Patent Application No. 10-2024-0006976, filed on Jan. 16, 2024, each of which is hereby incorporated by reference for all purposes as if fully set forth herein.

BACKGROUND

Field

Embodiments of the invention relate generally to an identity authentication request method, an identity authentication request device, and an identity authentication system.

Discussion of Background

Recently, with the development of smart device technology, including smartphones, and the development of network technology, collecting biometric information through common devices in everyday life, such as smart devices or kiosk, and performing identity authentication through the biometric information to pay for certain products or gaining access has become an experience that may be easily encountered.

On the other hand, since identity authentication is a fundamental procedure for preventing identity theft, security may be said to be the most important factor in identity authentication technology.

Therefore, the development of identity authentication technology capable of providing procedural convenience to users while maintaining high security is continuously required.

The above information disclosed in this Background section is only for understanding of the background of the inventive concepts, and therefore, it may contain information that does not constitute prior art.

SUMMARY

An object of the present disclosure is to provide an identity authentication request method, an identity authentication request device, and an identity authentication system. The problems to be solved by the present disclosure are not limited to those described above, and other problems and advantages of the present disclosure that are not mentioned herein will be understood from the following description and will be more clearly understood from the embodiments of the present disclosure. In addition, it will be appreciated that the problems to be solved by the present disclosure and the advantages may be realized by the means indicated in the patent claims and combinations thereof.

A first aspect of the present disclosure may provide an identity authentication request method including: collecting authentication means data and detecting one or more devices; determining a closest device from among the one or more devices; receiving device identification data from the closest device; and transmitting the authentication means data to a device identified by the device identification data.

A second aspect of the present disclosure may provide an identity authentication request device including: a memory in which at least one program is stored; and a processor configured to be operated by executing the at least one program, wherein the processor may be further configured to: collect authentication means data and detect one or more devices; determine a closest device from among the one or more devices; receive device identification data from the closest device; and transmit the authentication means data to a device identified by the device identification data.

A third aspect of the present disclosure may provide a computer-readable recording medium having recorded thereon a program for causing a computer to perform the method according to the first aspect.

A fourth aspect of the present disclosure may provide an identity authentication system including: an identity authentication request device that collects authentication means data, detects one or more devices, transmits the authentication means data, and determines a closest device from among the one or more devices; and a user terminal that transmits stored identity authentication data, wherein the identity authentication request device may determine whether the authentication means data matches the identity authentication data.

A fifth aspect of the present disclosure may provide an identity authentication system including: an identity authentication request device that collects authentication means data, detects one or more devices, transmits the authentication means data, and determines a closest device from among the one or more devices; a user terminal that transmits an identification number of a dedicated identity authentication device in response to the determination of the closest device; and the dedicated identity authentication device that stores identity authentication data received from the user terminal and determines whether the authentication means data matches the identity authentication data.

According to various embodiments of the present disclosure, even when a person attempting identity authentication does not directly input identification information of an identity authentication device he/she uses, such as his/her phone number, it may be verified that the person attempting identity authentication is the same person as the owner of the identity authentication device.

Accordingly, the time required for identity authentication may be greatly saved, and high satisfaction may be provided to those who experience the identity authentication system of the present disclosure.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

FIG. 8 is a flowchart for describing an identity authentication process according to another embodiment of the present disclosure.

FIGS. 9A and 9B are flowcharts for describing an identity authentication process according to another embodiment of the present disclosure.

FIGS. 10A, 10B, and 10C are flowcharts for describing an identity authentication process according to another embodiment of the present disclosure.

DETAILED DESCRIPTION

Figure 1:
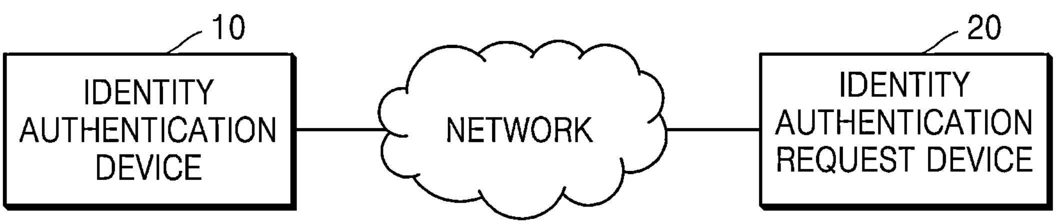
FIG. 1 is a block diagram for describing an identity authentication system according to an embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The present disclosure relates to an identity authentication request method, an identity authentication request device, and an identity authentication system. An identity authentication request method according to an embodiment of the present disclosure may include: collecting authentication means data and detecting one or more devices; determining a closest device from among the one or more devices; receiving device identification data from the closest device; and transmitting the authentication means data to a device identified by the device identification data.

The advantages and features of the present disclosure, and methods of achieving them will be clarified with reference to embodiments described below in detail with reference to the accompanying drawings. However, the present disclosure is not limited to the embodiments presented below and may be implemented in various different forms. Rather, it will be understood that the present disclosure includes all modifications, equivalents, and substitutes falling within the concept and technical scope of the present disclosure. The embodiments presented below are provided so that the present disclosure will be thorough and complete and will fully convey the concept of the present disclosure to those of ordinary skill in the art. In describing the present disclosure, when the detailed description of the relevant known technology is determined to obscure the gist of the present disclosure, the detailed description thereof may be omitted.

The terms as used herein are only used to describe particular embodiments and are not intended to limit the present disclosure. The singular forms as used herein are intended to include the plural forms as well unless the context clearly indicates otherwise. The terms "comprise," "include," or "have" as used in the present application are inclusive and therefore specify the presence of one or more stated features, integers, steps, operations, elements, components, or any combination thereof, but do not preclude the presence or addition of one or more other features, integers, steps, operations, elements, components, or any combination thereof.

Some embodiments of the present disclosure may be represented by functional block configurations and various processes. Some or all of such functional blocks may be implemented in any number of hardware and/or software configurations that perform specific functions. For example, the functional blocks of the present disclosure may be implemented by one or more microprocessors or may be implemented by circuit configurations for certain functions. In addition, for example, the functional blocks of the present disclosure may be implemented in various programming or scripting languages. The functional blocks may be implemented as algorithms to be executed by one or more processors. In addition, the present disclosure may employ conventional technologies for electronic environment setting, signal processing, and/or data processing. The terms such as "mechanism," "element," "means," and "configuration" may be used broadly and are not limited to mechanical and physical configurations.

In addition, connecting lines or connecting members illustrated in the drawings are intended to represent functional connections and/or physical or circuit connections. In an actual device, connecting lines or connecting members illustrated in the drawings may represent connections between components by means of a variety of functional, physical, or circuit connections that may be substituted or added.

In the present disclosure, the term "authentication means data" is used to refer to data that serves as an identity authentication means, that is, data input for identity authentication by a person attempting identity authentication and data collected by a specific device. A person attempting identity authentication may input authentication means data so as to gain access to a restricted procedure through identity authentication. Authentication means data may be a specific type of data set to be used to perform identity authentication by a user or a system. For example, authentication means data may include biometric information of a user. In an embodiment, the biometric information may include one or more of fingerprint information, deoxyribonucleic acid (DNA) information, body skeleton information, hand shape information, retina information, iris information, facial information, vein information, electrocardiogram information, handwriting information, gait information, signature information, blood vessel information, sweat gland structure information, voice information, and biomolecules.

In the present disclosure, the term "identity authentication data" is used to refer to a user's own data stored in an identity authentication device by a user of the identity authentication device, that is, data that serves as a standard for determining whether authentication means data is data of a person attempting identity authentication. In other words, the identity authentication device may perform identity authentication by comparing the authentication means data with the identity authentication data stored in the identity authentication device. The type of identity authentication data may be the same as the type of authentication means data. When the authentication means data is the same as the identity authentication data, identity authentication may be performed successfully and access to a restricted procedure through identity authentication may be approved.

On the other hand, in an embodiment, the identity authentication data may be collected through the identity authentication device and stored in the identity authentication device. In other words, the identity authentication data may be data stored by being input to a data input device, such as a camera or a fingerprint input device, which is provided in the identity authentication device, by the user of the identity authentication device for use of the identity authentication device or for identity authentication.

In another embodiment, the identity authentication data may be collected through an identity authentication request device and stored in an identity authentication device. Specifically, the identity authentication data may be collected through an identity authentication request device, transmitted to an identity authentication device (or to an identity authentication device through a server), and stored in the identity authentication device. The identity authentication data stored through this procedure may also be used to perform an identity authentication procedure according to a system of the present disclosure. For example, for the purpose of initial authentication for use of the identity authentication system, the identity authentication device may collect data as a user's "identity authentication data," and thereafter, when a user attempts identity authentication for use of the identity authentication system, the identity authentication device may collect data as a user's "authentication means data." Even when the type of identity authentication data is the same (e.g., facial recognition), the specifications of sensors that collect data may be different for each device. According to the present embodiment, the accuracy of identity verification of identity authentication data and authentication method data may be improved.

In the present disclosure, the term "device identification data" is used to refer to data for identifying an identity authentication device in an identity authentication system of the present disclosure. The identity authentication system of the present disclosure may include a plurality of identity authentication devices, and device identification data may be used to identify an identity authentication device used by a person attempting identity authentication among the plurality of identity authentication devices. For example, device identification data may include one or more of a phone number, a membership number, and a resident registration number.

FIG. 1 is a block diagram for describing an identity authentication system according to an embodiment of the present disclosure.

An identity authentication device 10 performs identity authentication, based on authentication means data received from an identity authentication request device 20. The identity authentication device 10 may perform identity authentication by comparing identity authentication data stored in the identity authentication device 10 with authentication means data collected by the identity authentication request device 20. For example, the identity authentication device 10 may be a portable electronic device of a user, and the identity authentication request device 20 may be an electronic device provided at an affiliated store of a business operator providing a service that the user wishes to use. The identity authentication request device 20 may be a device that permits access only when identity authentication is performed successfully. As a specific example, the identity authentication request device 20 may be a device installed at an entrance that permits entry only to those who have completed identity authentication. As another example, the identity authentication request device 20 may be a device installed at a checkout counter to authorize payment through identity authentication. In addition, the identity authentication request device 20 may be a type of device suitable for performing an identity authentication process so as to provide various services.

The identity authentication device 10 may include a communication unit, a processor, a memory, and a sensor.

In an embodiment, the identity authentication device 10 may be a mobile electronic device. For example, the identity authentication device 10 may be implemented as a smartphone, a tablet personal computer (PC), a PC, a smart TV, a personal digital assistant (PDA), a laptop, a media player, a navigation system, a device with a camera mounted thereon, and other mobile electronic devices. In addition, the identity authentication device 10 may be implemented as a wearable device, such as a watch, glasses, a hair band, or a ring, which has a communication function and a data processing function.

The communication unit of the identity authentication device 10 allows the identity authentication device 10 to communicate with an external device (e.g., the identity authentication request device 20 or the server).

For example, the communication performed by the communication unit of the identity authentication device 10 may include long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), etc. For example, the communication performed by the communication unit of the identity authentication device 10 may include wireless fidelity (WiFi), Bluetooth, Bluetooth Low Energy (BLE), Zigbee, near field communication (NFC), magnetic secure transmission, radio frequency (RF), or body area network (BAN). For example, the communication performed by the communication unit may include GNSS. The GNSS may be, for example, Global Positioning System (GPS), Global Navigation Satellite System (Glonass), Beidou Navigation Satellite System, Galileo, or the European global satellite-based navigation system.

The processor of the identity authentication device 10 controls the overall operation of the identity authentication device 10. For example, the processor of the identity authentication device 10 may control the overall operation of the identity authentication device by executing programs stored in the memory of the identity authentication device 10.

The processor of the identity authentication device 10 includes at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electrical units for performing functions.

The memory of the identity authentication device 10 is hardware that stores various data processed within the identity authentication device 10 and may store programs for processing and control by the processor of the identity authentication device 10. The programs may include, for example, a kernel, middleware, an application program interface (API), and/or an application program (or "application"). The memory of the identity authentication device 10 may store payment information, user information, etc.

The sensor of the identity authentication device 10 may convert measured or detected information into an electronic signal. The sensor of the identity authentication device 10 may include, for example, a gesture sensor, a biometric sensor, an olfactory (e-nose) sensor, an electromyography (EMG) sensor, an electroencephalogram (EEG) sensor, an electrocardiogram (ECG) sensor, an infrared (IR) sensor, an iris sensor, and/or a fingerprint sensor.

The sensor of the identity authentication device 10 may include a camera. The camera may be a device capable of generating still image and moving image data. The camera may include one or more image sensors (e.g., front or rear sensors), a lens, an image signal processor (ISP), or a flash (e.g., light-emitting diode (LED) or xenon lamp, etc.).

The identity authentication device 10 may further include an input/output device. The input/output device of the identity authentication device 10 may receive an input of a user of the identity authentication device 10 and convert the input of the user into an electronic signal so as to process the input of the user, or convert the electronic signal generated by the identity authentication device 10 into a signal to be provided to a user. For example, the input/output device of the identity authentication device 10 may include a touch panel, a (digital) pen sensor, a key, an ultrasonic input device, a display, or an audio module.

The identity authentication request device 20 may include a communication unit, a processor, a memory, and a sensor.

In an embodiment, the identity authentication request device 20 may be a mobile electronic device. For example, the identity authentication request device 20 may be implemented as a smartphone, a tablet PC, a PC, a smart TV, a PDA, a laptop, a media player, a navigation system, a device with a camera mounted thereon, and other mobile electronic devices. In addition, the identity authentication request device 20 may be implemented as a wearable device, such as a watch, glasses, a hair band, or a ring, which has a communication function and a data processing function.

The communication unit of the identity authentication request device 20 allows the identity authentication request device 20 to communicate with an external device (e.g., the identity authentication device 10 or the server).

For example, the communication performed by the communication unit of the identity authentication request device 20 may include LTE, LTE-A, CDMA, WCDMA, UMTS, WiBro, GSM, etc. For example, the communication performed by the communication unit of the identity authentication request device 20 may include WiFi, Bluetooth, BLE, Zigbee, NFC, magnetic secure transmission, RF, or BAN. For example, the communication performed by the communication unit may include GNSS. The GNSS may be, for example, GPS, Glonass, Beidou Navigation Satellite System, Galileo, or the European global satellite-based navigation system.

The processor of the identity authentication request device 20 controls the overall operation of the identity authentication request device 20. For example, the processor of the identity authentication request device 20 may control the overall operation of the identity authentication request device 20 by executing programs stored in the memory of the identity authentication request device 20.

The processor of the identity authentication request device 20 includes at least one of ASICs, DSPs, DSPDs, PLDs, FPGAs, controllers, micro-controllers, microprocessors, or other electrical units for performing functions.

The memory of the identity authentication request device 20 is hardware that stores various data processed within the identity authentication request device 20 and may store programs for processing and control by the processor of the identity authentication request device 20. The programs may include, for example, a kernel, middleware, an API, and/or an application program (or "application"). The memory of the identity authentication request device 20 may store payment information, user information, etc.

The sensor of the identity authentication request device 20 may convert measured or detected information into an electronic signal. The sensor of the identity authentication request device 20 may include, for example, a gesture sensor, a biometric sensor, an olfactory (e-nose) sensor, an EMG sensor, an EEG sensor, an ECG sensor, an IR sensor, an iris sensor, and/or a fingerprint sensor.

The sensor of the identity authentication request device 20 may include a camera. The camera may be a device capable of generating still image and moving image data. The camera may include one or more image sensors (e.g., front or rear sensors), a lens, an ISP, or a flash (e.g., LED or xenon lamp, etc.).

The identity authentication request device 20 may further include an input/output device. The input/output device of the identity authentication request device 20 may receive an input of a user of the identity authentication request device 20 and convert the input of the user into an electronic signal so as to process the input of the user, or convert the electronic signal generated by the identity authentication request device 20 into a signal to be provided to a user. For example, the input/output device of the identity authentication request device 20 may include a touch panel, a (digital) pen sensor, a key, an ultrasonic input device, a display, or an audio module.

Although not illustrated in FIG. 1, the identity authentication system according to an embodiment of the present disclosure may further include a server. For reasons such as ease of data storage, data distribution, design limitations, ease of design, etc., the identity authentication system may further include a server. In an embodiment, the identity authentication device 10 or the identity authentication request device 20 may transmit and receive a part of transmission/reception data through the server rather than directly therebetween.

The server may include a processor. The overall operation of the server may be controlled by the processor of the server. For example, the processor of the server may control the overall operation of the server by executing programs stored in a memory of the server.

Although not illustrated in FIG. 1, the identity authentication system according to an embodiment of the present disclosure may further include a dedicated identity authentication device. The dedicated identity authentication device is a device that is provided separately from the identity authentication device or the identity authentication request device, and may be a device that is provided individually so as to perform identity authentication without performing any other functions. When the identity authentication system includes the dedicated identity authentication device, there is an advantage of being able to perform identity authentication even when the identity authentication device or the user terminal is turned off. As described below, the dedicated identity authentication device may receive and store identity authentication data and determine whether authentication means data received thereafter matches the identity authentication data. The dedicated identity authentication device is described in detail below with reference to FIGS. 9A, 9B, and 10A to 10C.

The dedicated identity authentication device may include a processor. The overall operation of the dedicated identity authentication device may be controlled by the processor of the dedicated identity authentication device. For example, the processor of the dedicated identity authentication device may control the overall operation of the dedicated identity authentication device by executing programs stored in a memory of the dedicated identity authentication device.

On the other hand, the identity authentication device 10 may generate a signal continuously or periodically. Generating the signal continuously or periodically may be intended to enable access to the authentication system according to an embodiment of the present disclosure at any time. Specifically, a user of the identity authentication device 10 or a person attempting identity authentication through the identity authentication system according to an embodiment of the present disclosure does not intentionally initiate a series of identity authentication request procedures (or identity authentication procedures) according to the present disclosure through the identity authentication device 10 (e.g., not execute an application), and instead, the identity authentication device 10 may generate a signal continuously or periodically so that a series of identity authentication request procedures according to the present disclosure may be automatically performed when the identity authentication device 10 satisfies a specific condition (e.g., access to the identity authentication request device 20, communication connection to the identity authentication request device 20, etc.).

As a specific example, an identity authentication request method according to an embodiment of the present disclosure may be performed by interacting with an operation of an application installed on the identity authentication device 10 (e.g., a smartphone). The application may switch to a power saving mode when not executed continuously. When the application switches to the power saving mode, it may be difficult to automatically activate the application at the outside of the identity authentication device 10. Accordingly, the identity authentication device 10 of the present disclosure (or the application installed on the identity authentication device 10) may be implemented to generate a signal continuously or periodically, and thus, the activated state of the application may be maintained.

The signal generated continuously or periodically by the identity authentication device 10 may be transmitted to the server or the identity authentication request device 20. For example, the signal generated continuously or periodically may include position data, such as GPS data.

Hereinafter, a process, performed by the identity authentication system of the present disclosure, of requesting identity authentication and performing identity authentication is described in detail.

Figure 2:
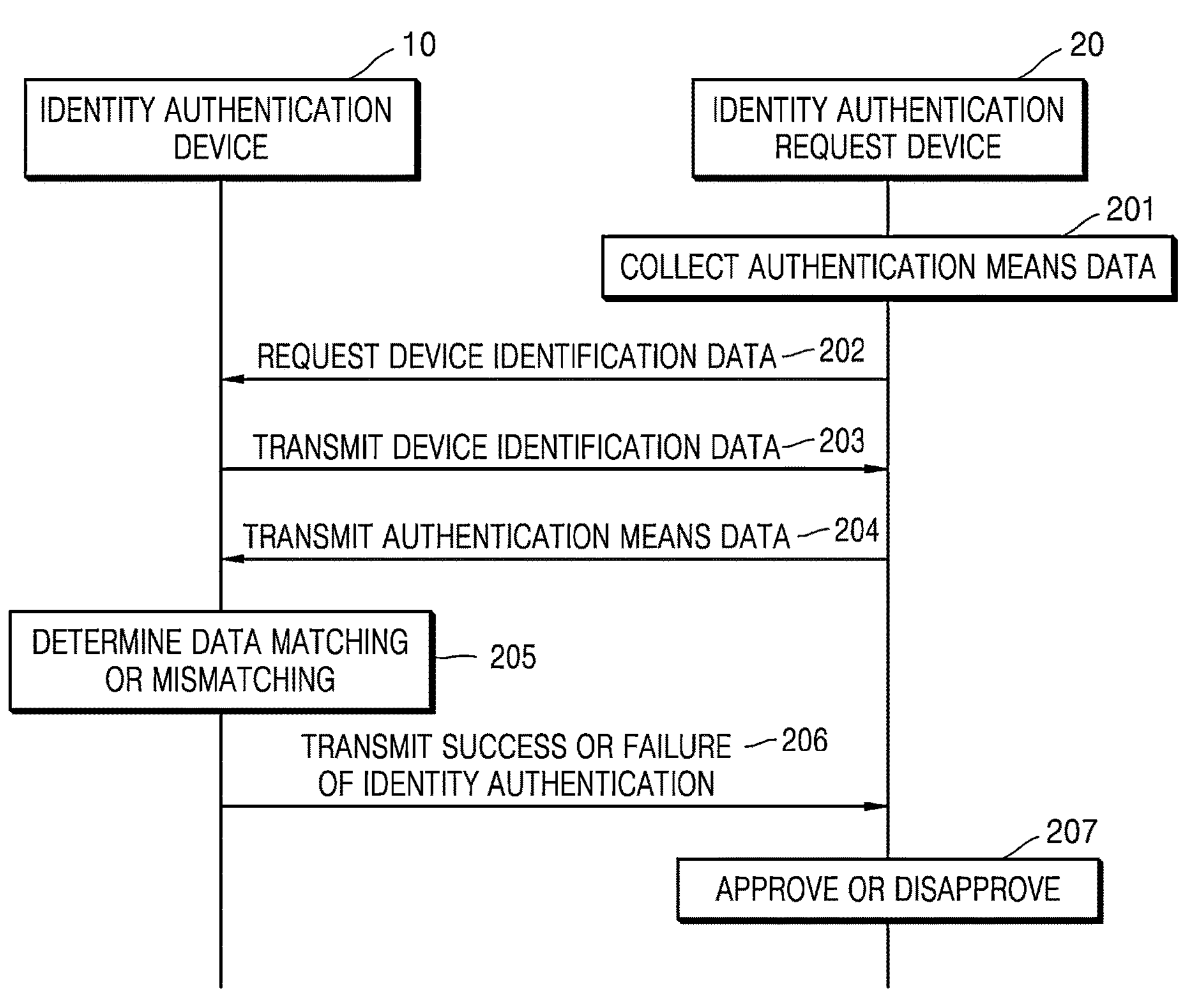
FIG. 2 is a flowchart for describing an identity authentication process according to an embodiment of the present disclosure.

FIG. 2 is a flowchart for describing an identity authentication process according to an embodiment of the present disclosure.

In the present disclosure, the identity authentication process may be performed by data transmission and reception between the identity authentication device 10 and the identity authentication request device 20.

In an embodiment, in operation 201, the identity authentication request device 20 may collect authentication means data.

In an embodiment, before operation 201 is performed, the user of the identity authentication device 10 may interact with the identity authentication request device 20 so as to input authentication means data. For example, the authentication means may be facial recognition and the identity authentication request device 20 may collect facial data as the authentication means data. In order to input the facial data, the user of the identity authentication device 10 may approach the identity authentication request device 20 and interact with the identity authentication request device 20.

In an embodiment, in operation 202, the identity authentication request device 20 may request device identification data.

In an embodiment, one or more persons may approach the identity authentication request device 20. That is, one or more devices may be detected by the identity authentication request device 20 (e.g., the sensor or the communication unit included in the identity authentication request device 20). For example, when the identity authentication request device 20 is a device installed at an entrance that permits entry, a plurality of persons may be standing in line to pass through the entrance. In this case, one or more devices may be detected by the identity authentication request device 20. When one or more devices are detected by the identity authentication request device 20, the identity authentication request device 20 may determine one of the one or more devices as the target of the device identification data request. An embodiment of determining the target of the device identification data request is described in detail below with reference to FIGS. 4 and 5.

In an embodiment, in operation 203, the identity authentication device 10 may transmit the device identification data to the identity authentication request device 20 in response to receiving a request for the identity authentication data.

In an embodiment, the identity authentication device 10 may receive an additional input of the user of the identity authentication device 10 (e.g., an input of approving data transmission) and transmit the device identification data, or may automatically transmit the device identification data in response to request for the device identification data.

In an embodiment, in operation 204, the identity authentication request device 20 may transmit the authentication means data to the identity authentication device 10.

The target to which the identity authentication request device 20 transmits the authentication means data may be determined based on the device identification data rather than being determined as the target requesting the device identification data. That is, the identity authentication request device 20 may transmit the authentication means data to a device identified by the device identification data. As a result, the identity authentication device 10 that has transmitted the device identification data receives the authentication means data transmitted by the identity authentication request device 20, but this may be a result obtained when the identity authentication process proceeds normally.

In an embodiment, a method by which the identity authentication request device 20 requests and receives the device identification data may be different from a method by which the identity authentication request device 20 transmits the authentication means data. For example, the transmission and reception of the device identification data and the transmission and reception of the authentication means data may be performed through different networks.

In an embodiment, in operation 205, the identity authentication device 10 may determine whether the received authentication means data matches the identity authentication data stored in the identity authentication device 10.

The expression "the received authentication means data matches the identity authentication data stored in the identity authentication device 10" may mean that the authentication means data collected by the identity authentication request device 20 is data associated with the user of the identity authentication device 10.

On the other hand, as described above, the identity authentication data stored in the identity authentication device 10 may be collected through the identity authentication device 10 and stored in the identity authentication device 10, or may be collected through the identity authentication request device 20 and transmitted to and stored in the identity authentication device 10.

In an embodiment, in operation 206, the identity authentication device 10 may transmit the success or failure of identity authentication to the identity authentication request device 20.

Specifically, the identity authentication device 10 may transmit a signal indicating the success of the identity authentication in response to the determination that the received authentication means data matches the identity authentication data stored in the identity authentication device 10. In contrast, the identity authentication device 10 may transmit a signal indicating the failure of the identity authentication in response to the determination that the received authentication means data does not match the identity authentication data stored in the identity authentication device 10.

In an embodiment, in operation 207, the identity authentication request device 20 may approve or disapprove access to a restricted procedure through identity authentication, based on the received signal. For example, when the identity authentication request device 20 is a device installed at an entrance that permits entry, the identity authentication request device 20 may approve entry.

Figure 3A:
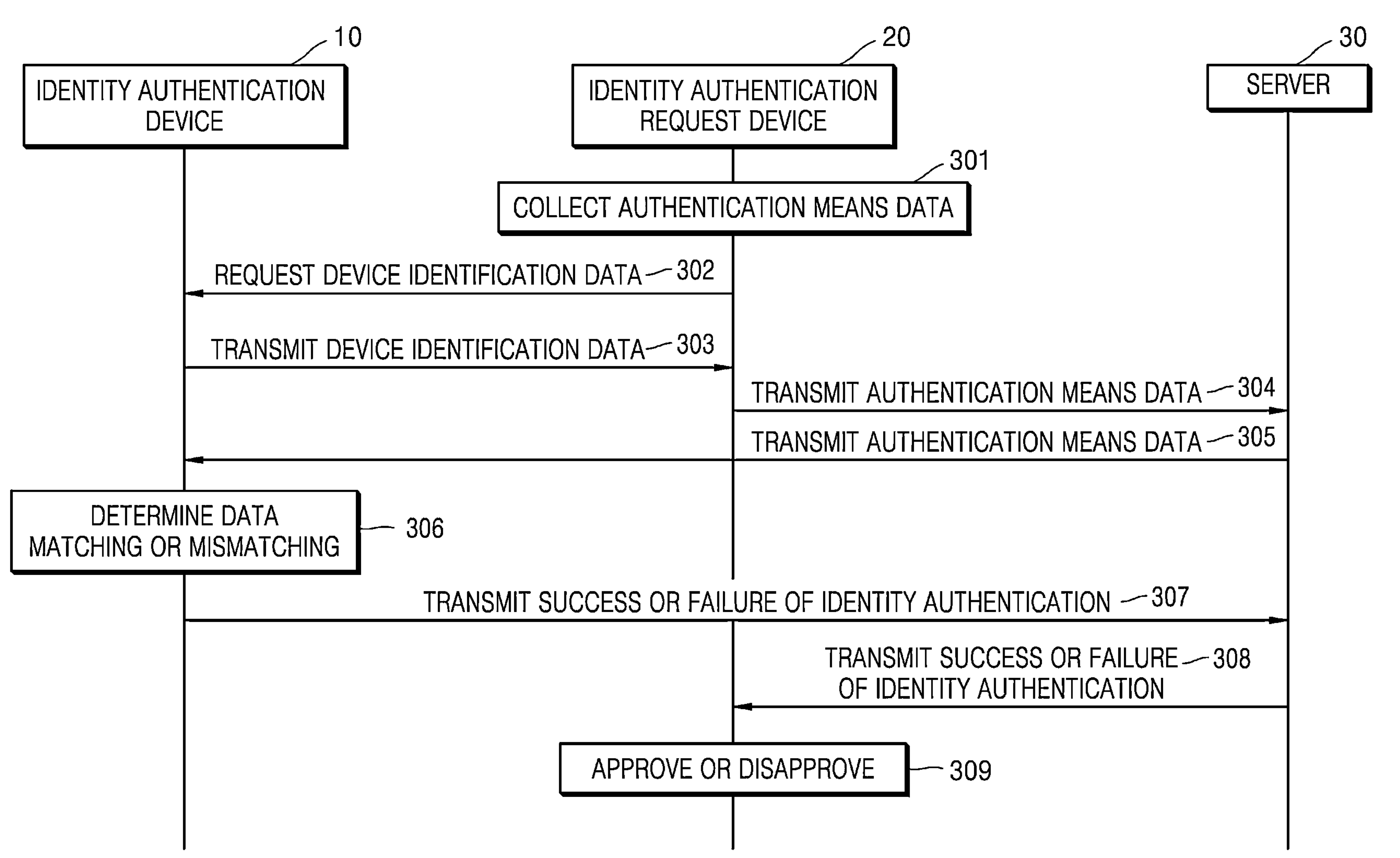
FIGS. 3A and 3B are flowcharts for describing an identity authentication process according to another embodiment of the present disclosure.
Figure 3B:
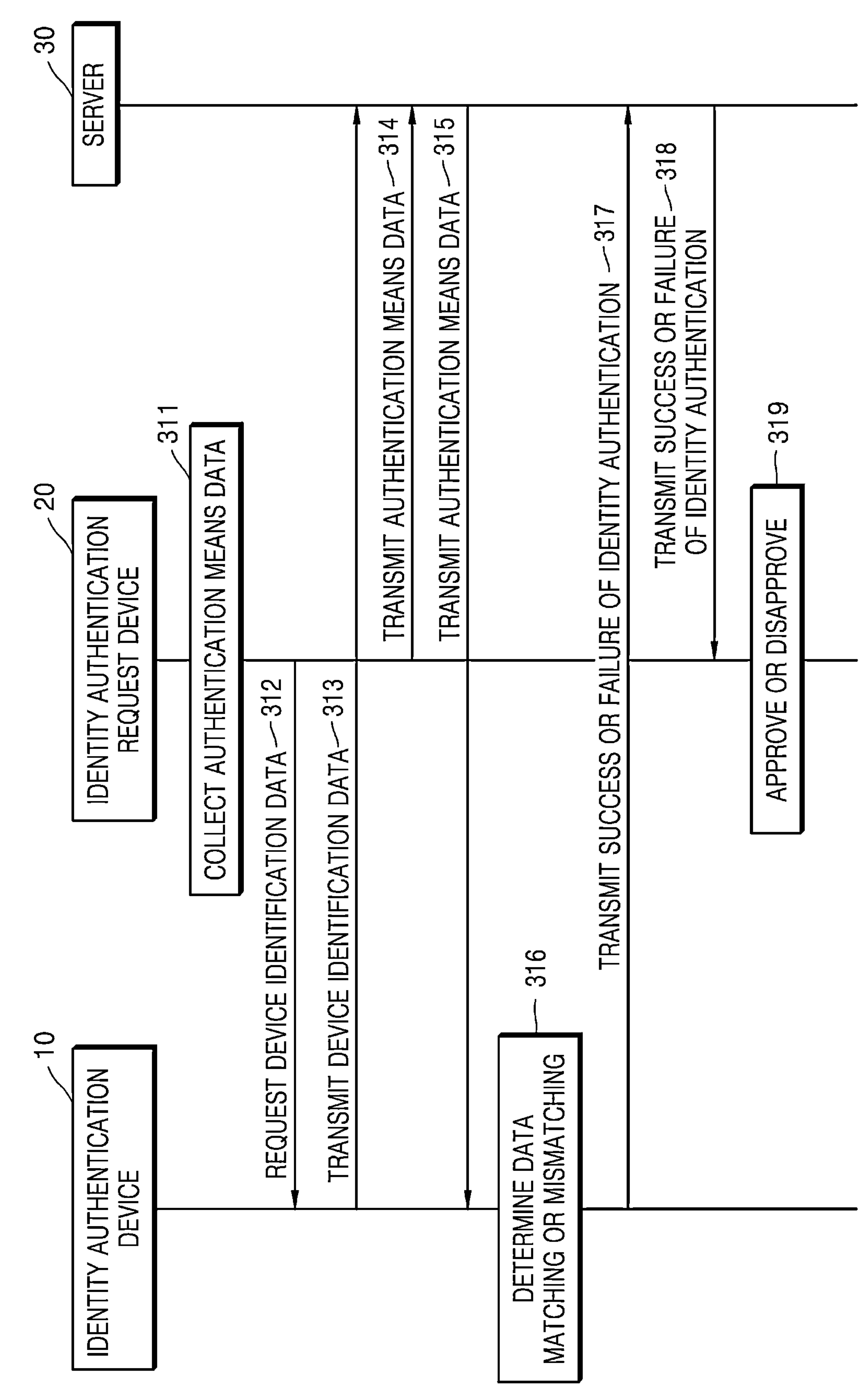

FIGS. 3A and 3B are flowcharts for describing an identity authentication process according to another embodiment of the present disclosure.

In the following description of FIG. 3A, a detailed description redundant with those provided with reference to FIG. 2 is omitted.

In an embodiment, in operation 301, the identity authentication request device 20 may collect authentication means data.

In an embodiment, in operation 302, the identity authentication request device 20 may request device identification data.

In an embodiment, in operation 303, the identity authentication device 10 may transmit the device identification data to the identity authentication request device 20 in response to receiving the request for the device identification data.

Since operations 301 to 303 may respectively correspond to operations 201 to 203 of FIG. 2, a detailed description of operations 301 to 303 is omitted.

On the other hand, in an embodiment, instead of operations 302 and 303, the server 30 may mediate the transmission and reception of the device identification data. Specifically, in an embodiment, the identity authentication request device 20 may request the device identification data from the server 30. In this case, the server 30 may request the device identification data from the identity authentication device 10. In addition, in an embodiment, the identity authentication device 10 may transmit the device identification data to the server 30. In this case, the server 30 may transmit the device identification data to the identity authentication request device 20.

In an embodiment, in operation 304, the identity authentication request device 20 may transmit the authentication means data to the server 30.

In operation 304, unlike operation 204 of FIG. 2, the target to which the identity authentication request device 20 transmits the authentication means data is the server 30. In the present embodiment, compared to a case where the identity authentication request device 20 transmits the authentication means data to the identity authentication device 10, a case where the identity authentication request device 20 transmits the authentication means data to the server 30 has an advantage in which security is enhanced and a design process is made easy.

In an embodiment, operation 304 may include transmitting, by the identity authentication request device 20, the device identification data to the server 30. Accordingly, the server 30 may identify the target to which the authentication means data is to be transmitted.

In the description provided with reference to operation 204 of FIG. 2, those applicable to operation 304 may also be implemented in operation 304 even when not separately mentioned.

In an embodiment, in operation 305, the server 30 may transmit the authentication means data to the identity authentication device 10.

In an embodiment, the server 30 may transmit the authentication means data to a device identified by the device identification data transmitted by the identity authentication request device 20.

In an embodiment, the server 30 may additionally perform a security enhancement process on the authentication means data received in operation 304.

In an embodiment, in operation 306, the identity authentication device 10 may determine whether the received authentication means data matches the identity authentication data stored in the identity authentication device 10.

Since operation 306 may correspond to operation 205 of FIG. 2, a detailed description of operation 306 is omitted.

In an embodiment, in operation 307, the identity authentication device 10 may transmit the success or failure of identity authentication to the server 30.

In operation 307, unlike operation 206 of FIG. 2, the target to which the identity authentication request device 20 transmits the success or failure of identity authentication is the server 30. In the present embodiment, compared to a case where the identity authentication request device 20 transmits the success or failure of identity authentication to the identity authentication device 10, a case where the identity authentication request device 20 transmits the success or failure of identity authentication to the server 30 has an advantage in which security is enhanced and a design process is made easy.

In the description provided with reference to operation 206 of FIG. 2, those applicable to operation 307 may also be implemented in operation 307 even when not separately mentioned.

In an embodiment, in operation 308, the server 30 may transmit the success or failure of identity authentication to the identity authentication device 10.

In an embodiment, in operation 309, the identity authentication request device 20 may approve or disapprove access to a restricted procedure through identity authentication, based on the received signal.

Since operation 309 may correspond to operation 207 of FIG. 2, a detailed description of operation 309 is omitted.

FIG. 3B is a flowchart for describing an identity authentication process according to another embodiment of the present disclosure. In the following description of FIG. 3B, a detailed description redundant with those provided with reference to FIG. 3A is omitted.

Since operations 311 and 312 may respectively correspond to operations 301 and 302 of FIG. 3A, a detailed description of operations 311 and 312 is omitted.

As a difference from the embodiment of FIG. 3A, in an embodiment, in operation 313, the identity authentication device 10 may transmit the device identification data to the server 30 in response to receiving the request for the device identification data.

As an example, the communication between the identity authentication request device 20 and the identity authentication device 10 may be unidirectional rather than bidirectional, and the identity authentication device 10 may transmit the device identification data to the server rather than the identity authentication request device 20.

In an embodiment, the identity authentication device 10 may transmit position identification data to the server 30 along with the device identification data. When the identity authentication device 10 transmits the device identification data, it may be difficult for the server 30 to know which device has transmitted the device identification data. Accordingly, the identity authentication device 10 may also transmit the position identification data to the server 30. The position identification data is data for identifying the position of the identity authentication device 10. As an example, the server 30 may identify the identity authentication device 10 by comparing the position of the identity authentication request device 20 with the position data transmitted by the identity authentication device 10. For example, the position identification data may be GPS data.

Since operation 314 may correspond to operation 304 of FIG. 3A, a detailed description of operation 314 is omitted.

In an embodiment, in operation 315, the server 30 may transmit the authentication means data to the identity authentication device 10.

In an embodiment, the server 30 may transmit the authentication means data to a device identified by the device identification data transmitted by the identity authentication device 10.

Since operations 316 to 319 may respectively correspond to operations 306 to 309 of FIG. 3A, a detailed description of operations 316 to 319 is omitted.

Figure 4:
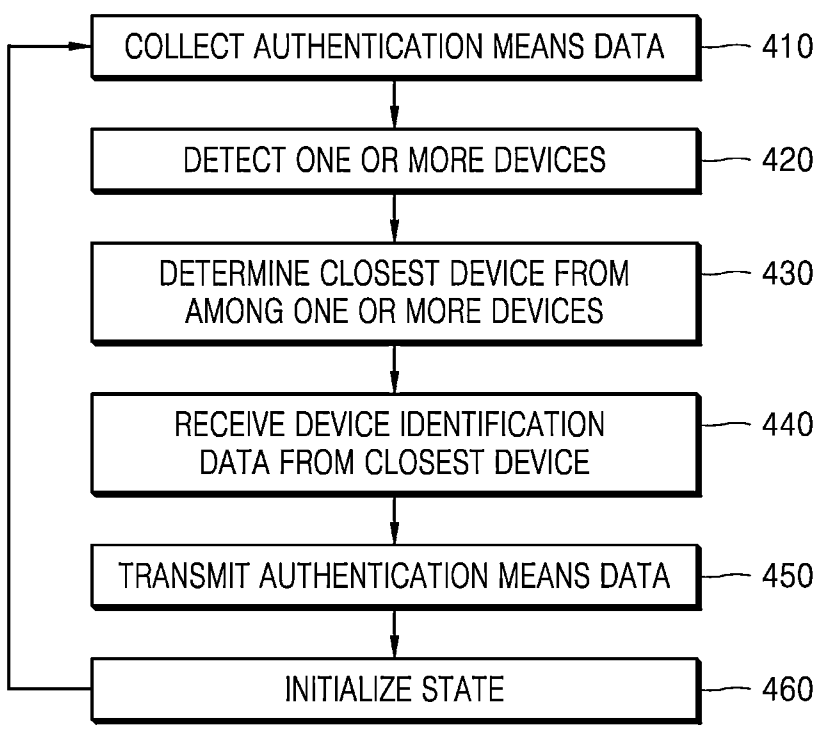
FIG. 4 is a flowchart for describing a process of determining a target of a device identification data request according to an embodiment of the present disclosure.

FIG. 4 is a flowchart for describing a process of determining a target of a device identification data request according to an embodiment of the present disclosure.

The process illustrated in FIG. 4 may be performed by the identity authentication request device 20, specifically, the processor included in the identity authentication request device 20.

As described above, the identity authentication request device 20 of the present disclosure may request the device identification data and receive the device identification data. However, one or more devices may be detected by the identity authentication request device 20. At this time, the identity authentication request device 20 of the present disclosure may determine the target of the device identification data request through the process illustrated in FIG. 4.

In an embodiment, in operation 410, the identity authentication request device 20 may collect authentication means data.

Since operation 410 may correspond to operation 201 of FIG. 2 or operation 301 of FIG. 3, a detailed description of operation 410 is omitted.

In an embodiment, in operation 420, the identity authentication request device 20 may detect one or more devices.

In an embodiment, the identity authentication request device 20 may detect one or more devices through any suitable means for detecting devices (e.g., the identity authentication device 10) around the identity authentication request device 20. For example, the identity authentication request device 20 may detect one or more devices by detecting signals generated by the devices around the identity authentication request device 20. For example, the identity authentication request device 20 may detect one or more devices by detecting that one or more devices on which an application is installed approaches the identity authentication request device 20.

In an embodiment, the identity authentication request device 20 may detect one or more devices by connecting to the one or more devices through bidirectional communication. Specifically, an automatic connection function of the identity authentication request device 20 for a specific communication scheme may be in an ON state. A specific device may be connected to the identity authentication request device 20 by approaching the identity authentication request device 20. In this manner, the identity authentication request device 20 may detect the specific device. In another embodiment, the identity authentication request device 20 may switch the automatic connection function for the specific communication scheme to an ON state in response to collecting the authentication means data.

In an embodiment, one or more devices detected by the identity authentication request device 20 may be devices that have a record of being paired with the identity authentication request device 20 through the specific communication scheme in the past. In other words, when one or more devices that have a record of being paired with the identity authentication request device 20 through the specific communication scheme in the past approach the identity authentication request device 20 within a certain distance. The one or more devices may be automatically detected through the specific communication scheme. For example, the specific communication scheme may include a Bluetooth scheme. On the other hand, in order to detect a plurality of devices, the identity authentication request device 20 may include a plurality of components that connect communication with the devices (e.g., the identity authentication device 10). For example, the identity authentication request device 20 may include n Bluetooth channels for Bluetooth connection with n devices.

In an embodiment, in operation 430, the identity authentication request device 20 may determine a closest device from among one or more detected devices.

In the present embodiment, the determining, by the identity authentication request device 20, the closest device from among one or more devices may be for determining the subject that inputs the authentication means data collected by the identity authentication request device 20. This is because the subject that inputs the authentication means data collected by the identity authentication request device 20 is likely to be a person closest to the identity authentication request device 20.

In an embodiment, the identity authentication request device 20 may determine the closest device from among one or more detected devices, based on any suitable method.

A method, performed by the identity authentication request device 20, of determining the closest device from among one or more detected devices, according to an embodiment of the present disclosure, is described in detail with reference to FIG. 5.

In an embodiment, in operation 440, the identity authentication request device 20 may receive device identification data from the closest device.

As described above, the determining, by the identity authentication request device 20, the closest device from among one or more devices may be for determining the subject that inputs the authentication means data collected by the identity authentication request device 20. In the present embodiment, since the identity authentication request device 20 receives the device identification data from the subject that inputs the authentication means data, which is assumed to be the same as the user of the closest device, the identity authentication request device 20 may accurately transmit the authentication means data in operation 450.

For identity authentication based on the collected authentication means data, it is necessary to verify that a person attempting identity authentication by inputting the authentication means data is the same as an owner of the identity authentication device 10. In the past, for this verification, the person attempting identity authentication (or through the administrator of the identity authentication request device 20) had to input device identification data (e.g., a phone number), which is identification information of the identity authentication device 10. However, in the present disclosure, the process in which the person attempting identity authentication manually inputs the device identification data may be omitted through operations 430 and 440, that is, through the process in which the identity authentication request device 20 determines the closest device and receives the device identification data from the closest device. Since it is unnecessary to manually input the device identification data, the time required for full identity authentication for one person may be greatly saved, and a highly satisfying experience may be provided to the user of the identity authentication system.

Prior to operation 440, the identity authentication request device 20 may request the device identification data from the closest device. That is, operation 440 may be performed by the identity authentication request device 20 requesting the device identification data from the closest device. In an embodiment, the identity authentication device 10 may receive an additional input of the user of the identity authentication device 10 (e.g., an input of approving data transmission) and transmit the device identification data, or may automatically transmit the device identification data in response to the request for the device identification data.

In an embodiment, in operation 450, the identity authentication request device 20 may transmit the authentication means data.

In the present embodiment, as described above, the identity authentication request device 20 may transmit the authentication means data to the device identified by the device identification data. Alternatively, the identity authentication request device 20 may transmit the authentication means data to the server. Since operation 450 may correspond to operation 204 of FIG. 2 or operation 304 of FIG. 3, a detailed description of operation 450 is omitted.

In an embodiment, in operation 460, the identity authentication request device 20 may initialize a state thereof.

In the present embodiment, initializing the state of the identity authentication request device 20 may mean deleting the history of detecting one or more devices and switching to the initial state. In other words, since the identity authentication request device 20 has completed one identity authentication request by transmitting the authentication means data, the identity authentication request device 20 may switch to the initial state and prepare an identity authentication request for a next person. For example, the identity authentication request device 20 may disconnect all connections with one or more devices. For example, the identity authentication request device 20 may forcibly terminate all Bluetooth connections.

In the embodiment illustrated in FIG. 4, the order in which the respective operations are performed may be changed as appropriate. For example, operation 460 may be performed after operation 440. In other words, when the identity authentication request device 20 receives device identification data from one device, the authentication request device 20 does not transmit authentication means data through an existing connection, but transmits authentication means data to the device identified by the device identification data (or transmits the device identification data and the authentication means data to the server). Accordingly, since there is no longer a need to maintain the connection with one or more devices, the authentication request device 20 may initialize the state thereof in response to receiving the device identification data.

Figure 5:
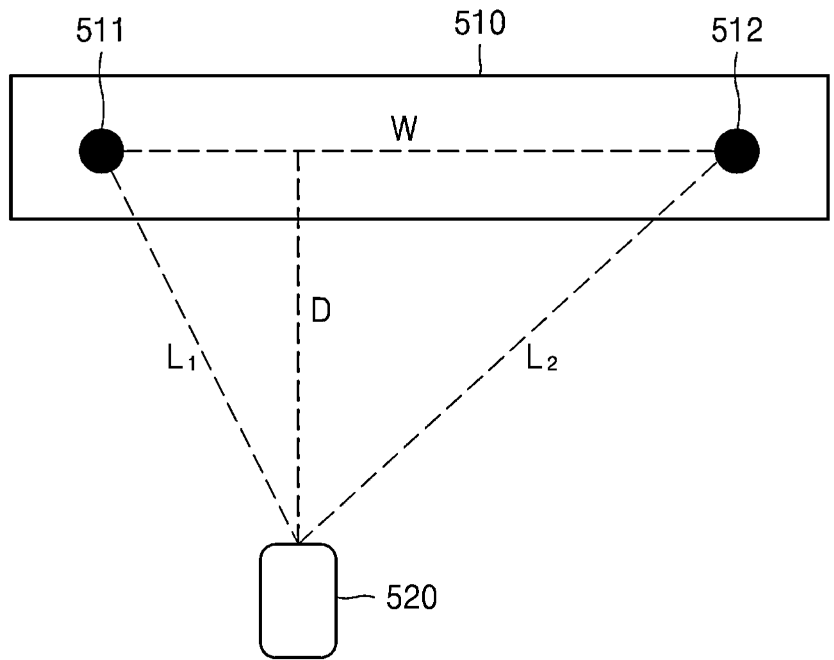
FIG. 5 is a schematic diagram for describing a process of calculating a distance to a detected device according to an embodiment of the present disclosure.

FIG. 5 is a schematic diagram for describing a process of calculating a distance to a detected device according to an embodiment of the present disclosure.

As described above, the identity authentication request device 20 may determine the closest device from among one or more detected devices. In an embodiment, the identity authentication request device 20 may calculate the distance to each of one or more devices so as to determine the closest device. FIG. 5 illustrates the process of calculating the distance to one device.

Referring to FIG. 5, a communication channel 510 included in the identity authentication request device 20 is a component that connects communication with a device (e.g., the identity authentication device 10) and may include a first node 511 and a second node 512. The first node 511 may be referred to as a left channel and the second node 512 may be referred to as a right channel. As described above, in an embodiment, the identity authentication request device 20 may connect communications with a plurality of devices, and thus, the identity authentication request device 20 may include a plurality of communication channels. In FIG. 5, one communication channel 510 is illustrated for convenience of explanation.

Referring to FIG. 5, a first device 520 connected to the communication channel 510 included in the identity authentication request device 20 is illustrated. As described above, the first device 520 may be brought closer to the identity authentication request device 20 within a certain distance and may be automatically detected by the identity authentication request device 20 (or the communication channel 510).

In the present disclosure, D, which is the distance between the identity authentication request device 20 and the first device 520, is to be finally calculated. In the present disclosure, the distance between the identity authentication request device 20 and the first device 520 may be considered to be equal to the distance between the communication channel 510 and the first device 520. In an embodiment, by transmitting and receiving test data to the first device 520, the identity authentication request device 20 may calculate the distance between the identity authentication request device 20 and the first device 520. Of course, the test data transmission and reception may be performed through a communication scheme that connects the identity authentication request device 20 to the first device 520.

Specifically, in an embodiment, the identity authentication request device 20 may transmit the test data to the first device 520. In an embodiment, the first device 520 that has received the test data may return the test data to the identity authentication request device 20. That is, the first device 520 may return the received test data to the identity authentication request device 20 as it is.

More specifically, each of the first node 511 and the second node 512 included in the communication channel 510 of the identity authentication request device 20 may transmit the test data to the first device 520. The distance between the identity authentication request device 20 and the first device 520 may be calculated based on the test data transmission and reception between each of the first node 511 and the second node 512 and the first device 520.

When the propagation speed of the test data is v and the time taken for one node to receive the test data back after transmitting the test data is t, the distance between one node and the first device 520 is (v*t)/2.

On the other hand, in an embodiment, the process of transmitting and receiving the test data between the identity authentication request device 20 and the first device 520 may be repeated a preset number of times. Since the distance between the identity authentication request device 20 and the first device 520 is not far, a large error may occur in the distance calculated through one-time test data transmission and reception. According to the present embodiment, it is preferable to perform the test data transmission and reception process a plurality of times.

Likewise, when the propagation speed of the test data is v, the total time for one node to transmit and receive data to and from the first device is T, and the preset number of times is n, the distance between one node and the first device 520 is (v*T)/(2*n).

The preset number of times may be appropriately set according to the propagation speed of the test data and the design environment of the identity authentication request device 20. For example, v may be 299 m/s, 792 m/s, or 458 m/s, and n may be set to about 299 times or 792 times.

Through the above-described process, $L_1$ and $L_2$, which are the distances between each of the first node 511 and the second node 512 and the first device 520, may be calculated.

On the other hand, w, which is the distance between the first node 511 and the second node 512, may be a value determined according to the design of the identity authentication request device 20 (or the communication channel 510).

Since a triangle where lengths of three sides are w, L1, and L2, respectively, D, which is the distance between the identity authentication request device 20 and the first device 520, may be calculated based on various properties of the triangle. For example, an angle formed by the side between the first node 511 and the second node 512 and the side between the first node 511 and the first device 520 may be calculated by using a cosine law, and D may be calculated based on the calculated angle and L1. This is provided simply as an example, and the distance between the identity authentication request device 20 and the first device 520 may be calculated by using any various properties of the triangle.

As described above, the identity authentication request device 20 may connect communications with a plurality of devices, and accordingly, the identity authentication request device 20 may include a plurality of communication channels. In an embodiment, the identity authentication request device 20 may calculate the distance to the identity authentication request device 20 for devices respectively connected to the plurality of communication channels included in the identity authentication request device 20. In an embodiment, the identity authentication request device 20 may determine the closest device, based on the distance calculated for each of the plurality of devices.

Figure 6:
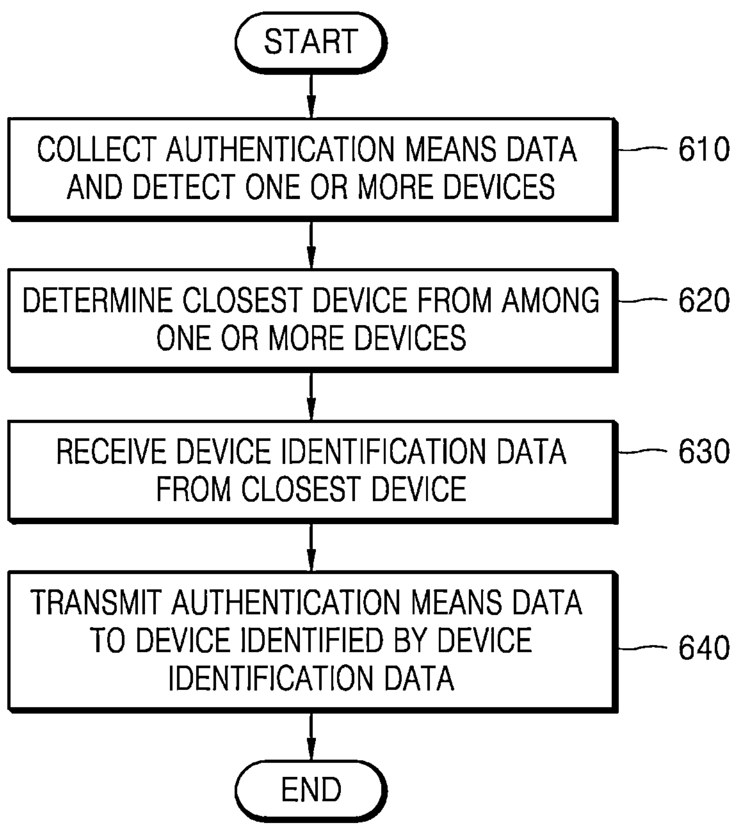
FIG. 6 is a flowchart of an identity authentication request method according to an embodiment of the present disclosure.

FIG. 6 is a flowchart of an identity authentication request method according to an embodiment of the present disclosure.

Operations illustrated in FIG. 6 may be performed by the identity authentication request device 20 described above. Specifically, the operations illustrated in FIG. 6 may be performed by the processor included in the identity authentication request device 20 described above.

In operation 610, the identity authentication request device 20 may collect authentication means data and detect one or more devices.

In an embodiment, the one or more devices may be devices that have a record of being paired through a specific communication scheme in the past, and operation 610 may be to detect the one or more devices through the specific communication scheme.

In operation 620, the identity authentication request device 20 may determine a closest device from among the one or more detected devices.

In an embodiment, operation 620 may include calculating the distance to each of the one or more devices.

In an embodiment, the calculating of the distance to each of the one or more devices may include transmitting and receiving test data to and from a first device included in the one or more devices, and calculating the distance to the first device, based on the time taken to transmit and receive the test data and the test data propagation speed.

In an embodiment, the transmitting and receiving of the test data may include repeating transmitting the test data to the first device and receiving the test data returned from the first device a preset number of times.

In an embodiment, the test data may be transmitted through a first node and a second node.

In an embodiment, the calculating of the distance to the first device may include calculating a first distance between the first node and the first device and a second distance between the second node and the first device.

In an embodiment, the calculating of the distance to the first device may include calculating the distance to the first device, based on the distance between the first node and the second node, the first distance, and the second distance.

In an embodiment, operation 620 may include determining the closest device as the device with the shortest calculated distance.

In operation 630, the identity authentication request device 20 may receive device identification data from the closest device.

In operation 640, the authentication means data may be transmitted to a device identified by the device identification data.

In an embodiment, operation 640 may be to transmit the authentication means data through the server to the device identified by the device identification data.

In an embodiment, after operation 640, the identity authentication request device 20 may receive the success or failure of identity authentication and may approve or disapprove access to a restricted procedure through identity authentication, based on the success or failure of identity authentication.

Hereinafter, an embodiment in which identity authentication is performed by a device other than the identity authentication device is described.

Figure 7:
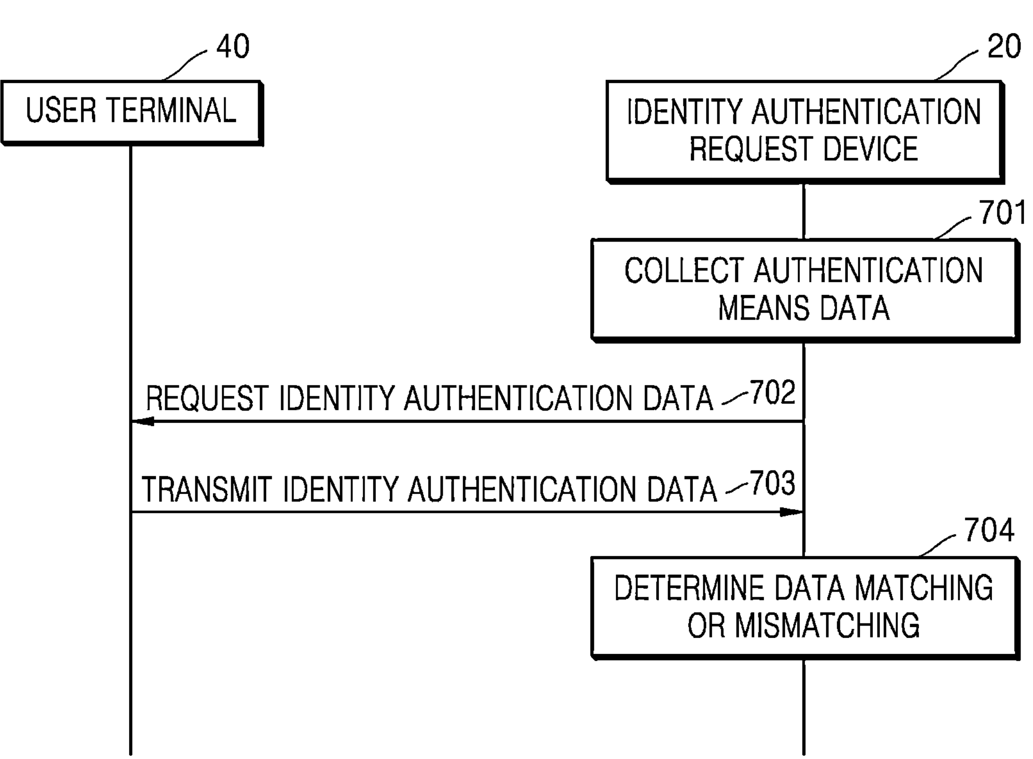
FIG. 7 is a flowchart for describing an identity authentication process according to another embodiment of the present disclosure.
Figure 10A:
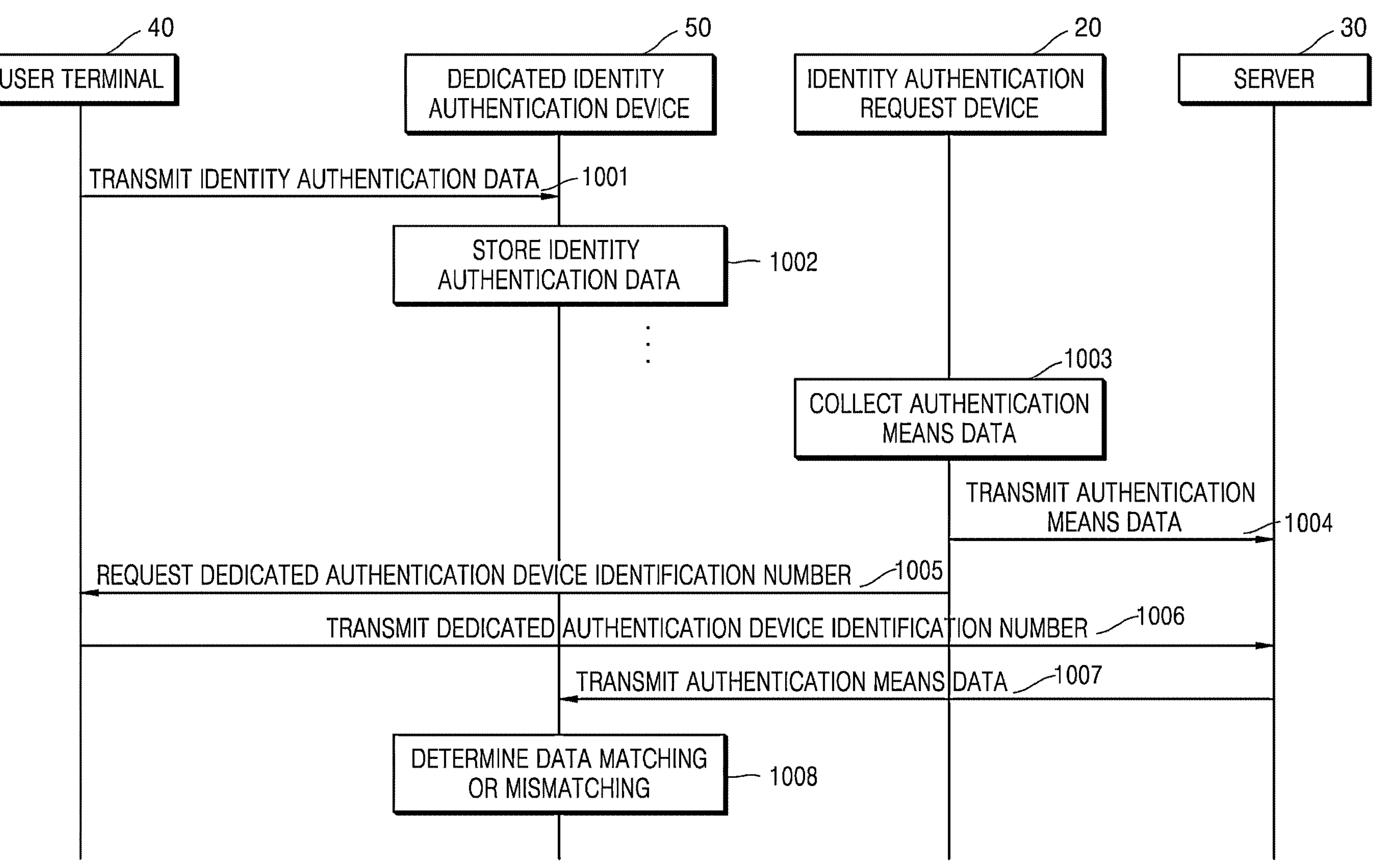
Figure 10C:
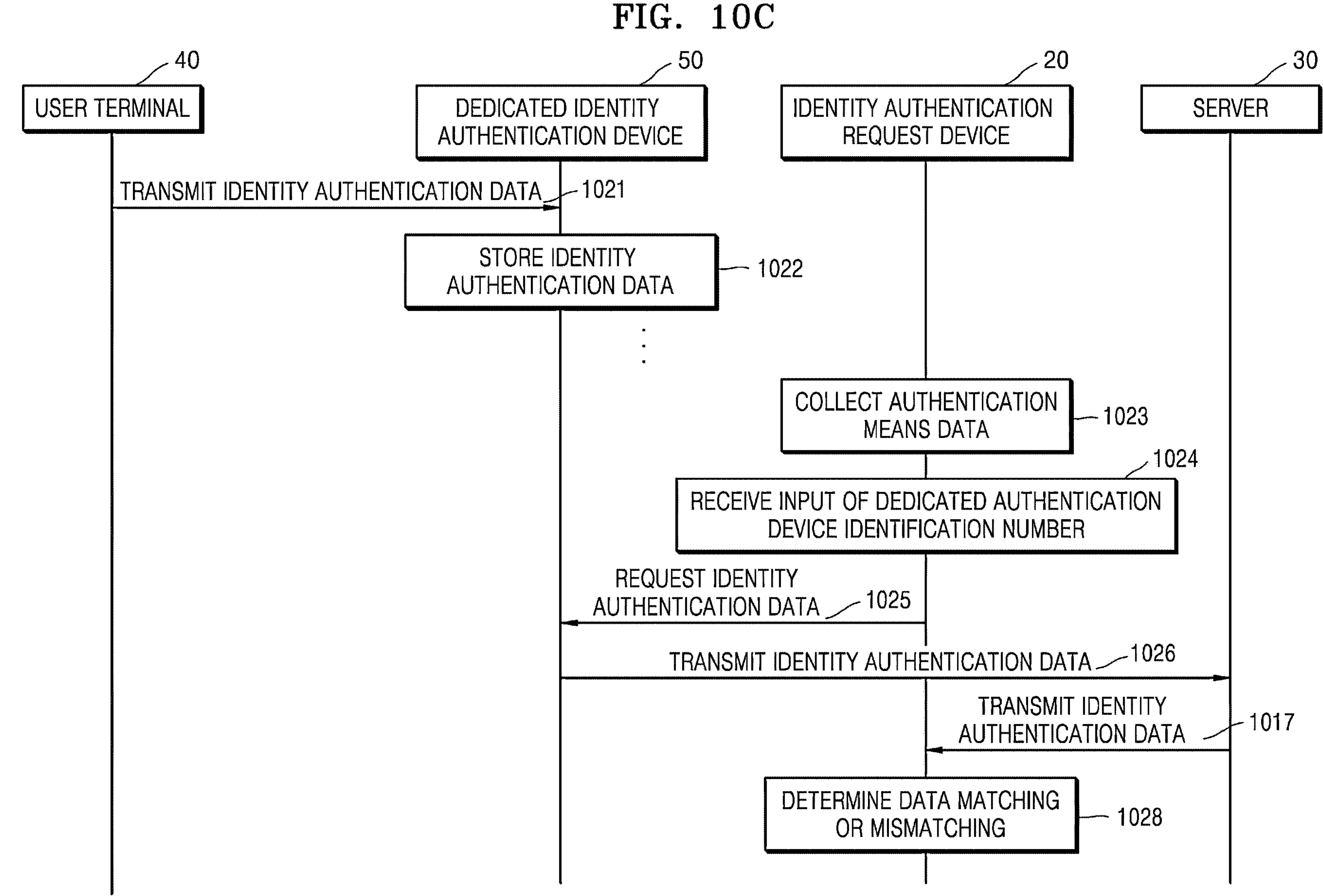

As described above, for example, the identity authentication device may be a portable electronic device of a user, and the identity authentication request device may be an electronic device provided at an affiliated store of a business operator providing a service that the user wishes to use. In the above-described embodiments, the portable electronic device of the user, that is, the identity authentication device determines whether the identity authentication data matches the authentication means data. Unlike the above-described embodiments, FIGS. 7 and 8 are associated with an embodiment in which the electronic device provided at the affiliated store of the business operator providing a service that the user wishes to use, that is, the identity authentication request device determines data matching or mismatching. In addition, FIGS. 9A and 10A are associated with an embodiment in which the identity authentication device determines data matching or mismatching, and FIGS. 9B, 10B, and 10C are associated with an embodiment in which the identity authentication request device in the identity authentication system including the dedicated identity authentication device determines data matching or mismatching.

In the embodiments described below, since the identity authentication device 10 does not perform data matching or mismatching, the term "user terminal" is used instead of the identity authentication device. However, in the practically applicable technical field, the identity authentication device described with reference to FIGS. 1 to 6 and the user terminal are substantially the same device. That is, the user terminal may be, for example, the portable electronic device of the user.

Since a part of the description of the above-described embodiments may be inferred and applied to the embodiments described below, a detailed description thereof is omitted.

FIG. 7 is a flowchart for describing an identity authentication process according to another embodiment of the present disclosure.

The identity authentication system that performs the identity authentication process described with reference to FIG. 7 may include an identity authentication request device 20 and a user terminal 40.

In an embodiment, in operation 701, the identity authentication request device 20 may collect authentication means data.

In an embodiment, in operation 702, the identity authentication request device 20 may request identity authentication data from the user terminal 40.

In an embodiment, in operation 703, the user terminal 40 may transmit identity authentication data to the identity authentication request device 20 in response to receiving the request for the identity authentication data.

In an embodiment, in operation 704, the identity authentication request device 20 may determine data matching or mismatching in response to receiving the identity authentication data.

That is, the identity authentication request device 20 may determine whether the received identity authentication data matches the collected authentication means data.

Thereafter, the identity authentication request device 20 may approve or disapprove access to a restricted procedure through identity authentication according to the determination made by the identity authentication request device 20. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

FIG. 8 is a flowchart for describing an identity authentication process according to another embodiment of the present disclosure.

Unlike FIG. 7, FIG. 8 is associated with an embodiment in which the server 30 mediates the identity authentication process. Accordingly, the identity authentication system that may perform the identity authentication process described with reference to FIG. 8 may include an identity authentication request device 20, a server 30, and a user terminal 40.

In an embodiment, in operation 801, the identity authentication request device 20 may collect authentication means data.

In an embodiment, in operation 802, the identity authentication request device 20 may request identity authentication data from the user terminal 40.

In an embodiment, in operation 803, the user terminal 40 may transmit identity authentication data to the server 30 in response to receiving the request for the identity authentication data.

In an embodiment, in operation 804, the server 30 may transmit the identity authentication data to the identity authentication request device 20 in response to receiving the identity authentication data.

On the other hand, in another embodiment, in operation 803, the user terminal 40 does not directly transmit the identity authentication data, but may transmit only the identification number of the user terminal 40, and in operation 804, the server 30 may transmit previously stored identity authentication data of the user terminal 40 to the identity authentication request device 20, based on the received identification number, in response to receiving the identification number of the user terminal 40.

In an embodiment, in operation 805, the identity authentication request device 20 may determine data matching or mismatching in response to receiving the identity authentication data.

That is, the identity authentication request device 20 may determine whether the received identity authentication data matches the collected authentication means data.

Thereafter, the identity authentication request device 20 may approve or disapprove access to a restricted procedure through identity authentication according to the determination made by the identity authentication request device 20. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

In the embodiments described with reference to FIGS. 7 and 8, the data matching or mismatching may be determined not by transmitting the authentication means data collected by the identity authentication request device 20 but by transmitting the identity authentication data to the identity authentication request device 20. Through this method, the identity authentication speed may be further increased.

FIGS. 9A and 9B are flowcharts for describing an identity authentication process according to another embodiment of the present disclosure.

The identity authentication system that performs the identity authentication process described with reference to FIGS. 9A and 9B may include an identity authentication request device 20, a user terminal 40, and a dedicated identity authentication device 50.

FIG. 9A is associated with an embodiment in which the data matching or mismatching is determined by the dedicated identity authentication device.

Operations 901 and 902 may correspond to a process in which a user of the user terminal 40 stores identity authentication data in the dedicated identity authentication device 50 of the user. That is, for the identity authentication process according to the present embodiment, the user may store his/her identity authentication data in the dedicated identity authentication device 50.

In an embodiment, in operation 901, the user terminal 40 may transmit identity authentication data to the dedicated identity authentication device 50.

In an embodiment, in operation 902, the dedicated identity authentication device 50 may store the identity authentication data in response to receiving the identity authentication data.

The stored identity authentication data may be used for identity verification in a subsequent operation.

Thereafter, in an embodiment, in operation 903, the identity authentication request device 20 may collect authentication means data.

In an embodiment, in operation 904, the identity authentication request device 20 may request a dedicated authentication device identification number from the user terminal 40.

The dedicated authentication device identification number may refer to a number used to identify a dedicated identity authentication device of a specific user. The dedicated authentication device identification number may be in any format.

In an embodiment, in operation 905, the user terminal 40 may transmit the dedicated authentication device identification number to the identity authentication request device 20 in response to receiving a request for the dedicated authentication device identification number.

In an embodiment, in operation 906, the identity authentication request device 20 may transmit the authentication means data to the dedicated identity authentication device 50 in response to receiving the dedicated authentication device identification number.

The identity authentication request device 20 may determine the dedicated identity authentication device 50 to which the authentication means data is to be transmitted, based on the received dedicated authentication device identification number.

In an embodiment, in operation 907, the dedicated identity authentication device 50 may determine data matching or mismatching in response to receiving the authentication means data.

That is, the dedicated identity authentication device 50 may determine whether the stored identity authentication data matches the received authentication means data.

Thereafter, in an embodiment, the dedicated identity authentication device 50 may transmit a result of the data matching or mismatching to the identity authentication request device 20. In an embodiment, the identity authentication request device 20 may approve or disapprove access to a restricted procedure through identity authentication, based on the received signal. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

On the other hand, in an embodiment, operations 904 and 905 may be optional. That is, operations 904 and 905 may be omitted in the system according to an embodiment. In the case of the system in which operations 904 and 905 are omitted, the identity authentication request device 20 may receive the input of the dedicated authentication device identification number of the user of the user terminal 40 after operation 903 or before operation 903. For example, the user may input the dedicated authentication device identification number through an input interface provided in the identity authentication request device 20. The identity authentication request device 20 may transmit authentication means data, based on the input dedicated authentication device identification number.

FIG. 9B is associated with an embodiment in which data matching or mismatching is determined by the identity authentication request device of the identity authentication system including the dedicated identity authentication device.

Operations 911 to 915 may be the same as operations 901 to 905, respectively.

In an embodiment, in operation 916, the identity authentication request device 20 may request the identity authentication data from the dedicated identity authentication device 50.

The identity authentication request device 20 may identify a device from which to request the identity authentication data, based on the received dedicated authentication device identification number.

In an embodiment, in operation 917, the dedicated identity authentication device 50 may transmit the identity authentication data to the identity authentication request device 20 in response to receiving a request for the identity authentication data.

In an embodiment, in operation 918, the identity authentication request device 20 may determine data matching or mismatching in response to receiving the identity authentication data.

That is, the identity authentication request device may determine whether the received identity authentication data matches the collected authentication means data.

Thereafter, in an embodiment, the identity authentication request device 20 may approve or disapprove access to a restricted procedure through identity authentication, based on a result of the data matching or mismatching. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

On the other hand, in an embodiment, operations 914 and 915 may be optional. That is, operations 914 and 915 may be omitted in the system according to an embodiment. In the case of the system in which operations 914 and 915 are omitted, the identity authentication request device 20 may receive the input of the dedicated authentication device identification number of the user of the user terminal 40 after operation 913 or before operation 913. For example, the user may input the dedicated authentication device identification number through an input interface provided in the identity authentication request device 20. The identity authentication request device 20 may request the identity authentication data, based on the input dedicated authentication device identification number.

FIGS. 10A to 10C are flowcharts for describing an identity authentication process according to another embodiment of the present disclosure.

Unlike FIGS. 9A and 9B, FIGS. 10A to 10C are associated with an embodiment in which the server 30 mediates the identity authentication process. Accordingly, the identity authentication system that may perform the identity authentication process described with reference to FIGS. 10A to 10C may include an identity authentication request device 20, a server 30, a user terminal 40, and a dedicated identity authentication device 50.

FIG. 10A is associated with an embodiment in which the data matching or mismatching is determined by the dedicated identity authentication device.

Operations 1001, 1002, and 1003 may be the same as operations 901, 902, and 903 of FIG. 9, respectively.

In an embodiment, in operation 1004, the identity authentication request device 20 may transmit the authentication means data to the server 30.

On the other hand, operation 1004 may be performed at any suitable time before operation 1007 to be described below.

In an embodiment, in operation 1005, the identity authentication request device 20 may request a dedicated authentication device identification number from the user terminal 40.

In an embodiment, in operation 1006, the user terminal 40 may transmit the dedicated authentication device identification number to the server 30 in response to receiving a request for the dedicated authentication device identification number.

In an embodiment, in operation 1007, the server 30 may transmit the authentication means data to the dedicated identity authentication device 50 in response to receiving the authentication means data and the dedicated authentication device identification number.

The server 30 may determine the dedicated identity authentication device 50 to which the authentication means data is to be transmitted, based on the received dedicated authentication device identification number.

In an embodiment, in operation 1008, the dedicated identity authentication device 50 may determine data matching or mismatching in response to receiving the authentication means data.

That is, the dedicated identity authentication device 50 may determine whether the stored identity authentication data matches the received authentication means data.

Thereafter, in an embodiment, the dedicated identity authentication device 50 may transmit a result of the data matching or mismatching to the identity authentication request device 20 or may transmit a result of the data matching or mismatching to the identity authentication request device 20 through the server 30. In an embodiment, the identity authentication request device 20 may approve or disapprove access to a restricted procedure through identity authentication, based on the received signal. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

On the other hand, in an embodiment, operations 1005 and 1006 may be optional. That is, operations 1005 and 1006 may be omitted in the system according to an embodiment. In the case of the system in which operations 1005 and 1006 are omitted, the identity authentication request device 20 may receive the input of the dedicated authentication device identification number of the user of the user terminal 40 after operation 1003 or before operation 1003. For example, the user may input the dedicated authentication device identification number through an input interface provided in the identity authentication request device 20. The identity authentication request device 20 may transmit the input dedicated authentication device identification number to the server 30. The server 30 may transmit authentication means data, based on the received dedicated authentication device identification number.

FIG. 10B is associated with an embodiment in which data matching or mismatching is determined by the identity authentication request device of the identity authentication system including the dedicated identity authentication device.

Operations 1011, 1012, 1013, 1014, and 1015 may be the same as operations 1001, 1002, 1003, 1005, and 1006, respectively.

In an embodiment, in operation 1016, the server 30 may request identity authentication data from the dedicated identity authentication device 50.

The server 30 may identify a device from which to request the identity authentication data, based on the received dedicated authentication device identification number.

In an embodiment, in operation 1017, the dedicated identity authentication device 50 may transmit the identity authentication data to the identity authentication request device 20 in response to receiving a request for the identity authentication data.

In an embodiment, in operation 1018, the identity authentication request device 20 may determine data matching or mismatching in response to receiving the identity authentication data.

That is, the identity authentication request device may determine whether the received identity authentication data matches the collected authentication means data.

Thereafter, in an embodiment, the identity authentication request device 20 may approve or disapprove access to a restricted procedure through identity authentication, based on a result of the data matching or mismatching. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

FIG. 10C is associated with another embodiment in which data matching or mismatching is determined by the identity authentication request device of the identity authentication system including the dedicated identity authentication device.

In a specific situation, it may be impossible for the identity authentication request device 20 to receive the dedicated authentication device identification number from the user terminal 40. For example, for some reasons, such as the reason that the user terminal 40 is not sufficiently close to the identity authentication request device 20, the user terminal 40 may not be able to transmit the dedicated authentication device identification number, or the identity authentication request device 20 may not be able to receive the dedicated authentication device identification number. FIG. 10C is associated with an embodiment that may solve this situation. Unlike FIG. 10A or 10B, the process of requesting the dedicated authentication device identification number or transmitting the dedicated authentication device identification number may be replaced with another process.

Operations 1021, 1022, and 1023 may be the same as operations 1011, 1012, and 1013 of FIG. 9, respectively.

In an embodiment, in operation 1024, the identity authentication request device 20 may receive the input of the dedicated authentication device identification number.

For example, the user may input the dedicated authentication device identification number through an input interface provided in the identity authentication request device 20.

In an embodiment, in operation 1025, the identity authentication request device 20 may request the identity authentication data from the dedicated identity authentication device 50.

The identity authentication request device 20 may identify a device from which to request the identity authentication data, based on the input dedicated authentication device identification number.

In an embodiment, in operation 1026, the dedicated identity authentication device 50 may transmit the identity authentication data to the server 30 in response to receiving a request for the identity authentication data.

In an embodiment, in operation 1027, the server 30 may transmit the identity authentication data to the identity authentication request device 20 in response to receiving the identity authentication data.

In an embodiment, in operation 1028, the identity authentication request device 20 may determine whether the received identity authentication data matches the collected authentication means data.

Thereafter, in an embodiment, the identity authentication request device 20 may approve or disapprove access to a restricted procedure through identity authentication, based on a result of the data matching or mismatching. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

Figure 11:
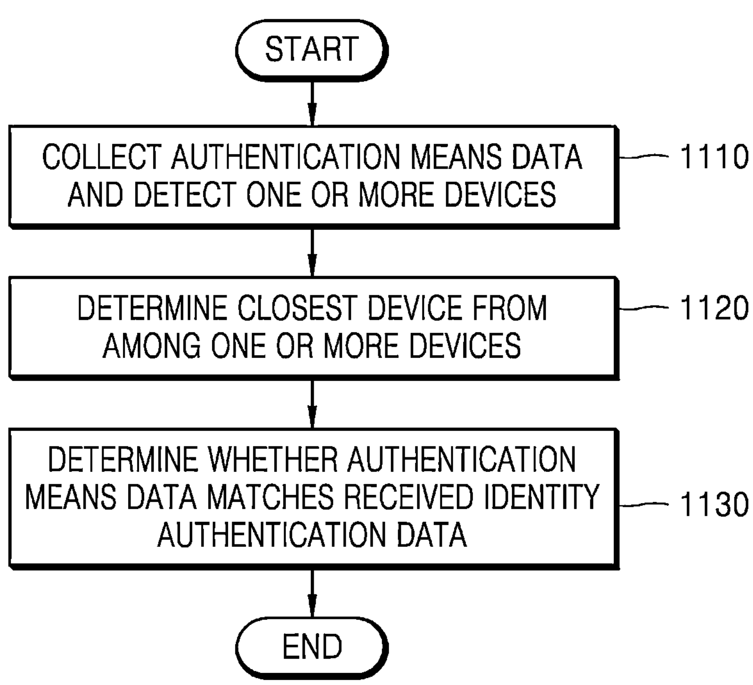
FIG. 11 is a flowchart of an identity authentication method according to an embodiment of the present disclosure.

FIG. 11 is a flowchart of an identity authentication method according to an embodiment of the present disclosure.

Operations illustrated in FIG. 11 may be performed by the identity authentication request device 20 described above, specifically, the processor of the identity authentication request device 20. The operation of the identity authentication request device 20 illustrated in FIG. 11 may be the operation of the identity authentication request device 20 of the identity authentication system described with reference to FIGS. 7 and 8. Since detailed embodiments associated with each operation have been described above, a description thereof is omitted.

In operation 1110, the identity authentication request device 20 may collect authentication means data and detect one or more devices.

In operation 1120, the identity authentication request device 20 may determine a closest device from among the one or more detected devices.

In an embodiment, the identity authentication request device 20 may receive device identification data from the closest device.

The identity authentication request device 20 may identify a device from which to request transmission of identity authentication data, based on the received device identification data. The embodiments related to the device identification data as described above may be inferred and applied.

In an embodiment, the identity authentication request device 20 may request the device identified by the device identification data, that is, the closest device, to transmit identity authentication data.

In an embodiment, the identity authentication request device 20 may receive the identity authentication data from the server or the closest device.

In operation 1130, the identity authentication request device 20 may determine whether the authentication means data matches the received identity authentication data.

Figure 12:
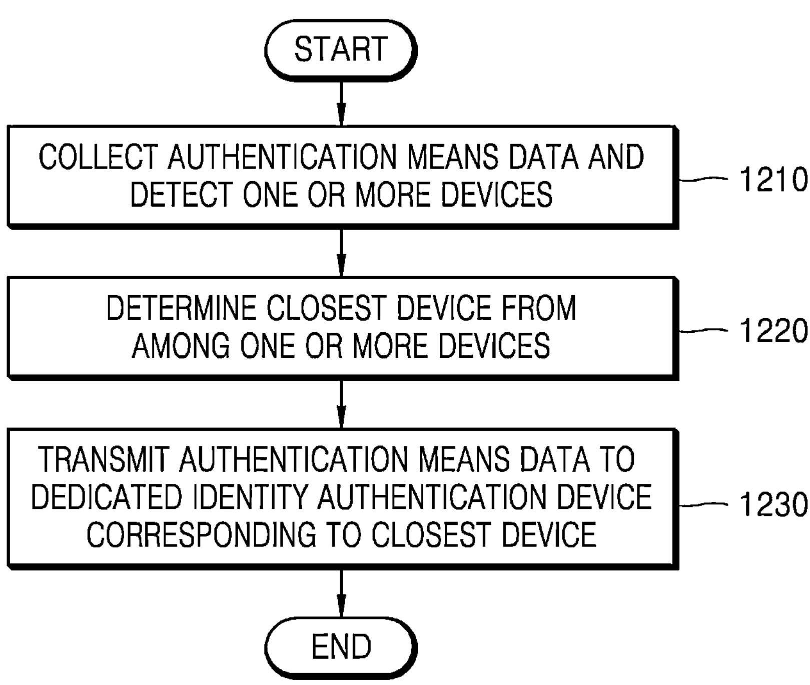
FIG. 12 is a flowchart of an identity authentication request method according to an embodiment of the present disclosure.

FIG. 12 is a flowchart of an identity authentication request method according to an embodiment of the present disclosure.

Operations illustrated in FIG. 12 may be performed by the identity authentication request device 20 described above, specifically, the processor of the identity authentication request device 20. The operation of the identity authentication request device 20 illustrated in FIG. 12 may be the operation of the identity authentication request device 20 of the identity authentication system described with reference to FIGS. 9 and 10. Since detailed embodiments associated with each operation have been described above, a description thereof is omitted.

In operation 1210, the identity authentication request device 20 may collect authentication means data and detect one or more devices.

In operation 1220, the identity authentication request device 20 may determine the closest device from among the one or more detected devices.

In an embodiment, the identity authentication request device 20 may receive device identification data from the closest device.

The identity authentication request device 20 may identify a device from which to request transmission of the identification number of the dedicated identity authentication device, based on the received device identification data. The embodiments related to the device identification data as described above may be inferred and applied.

In an embodiment, the identity authentication request device 20 may request the identification number of the dedicated identity authentication device corresponding to the closest device.

In an embodiment, the identity authentication request device 20 may receive the identification number of the dedicated identity authentication device.

In an embodiment, the identity authentication request device 20 may receive the identification number of the dedicated identity authentication device from the server or the user terminal.

In operation 1230, the identity authentication request device 20 may transmit the authentication means data to the dedicated identity authentication device corresponding to the closest device.

In an embodiment, the identity authentication request device 20 may transmit the authentication means data through the server or directly to the dedicated identity authentication device.

Figure 13:
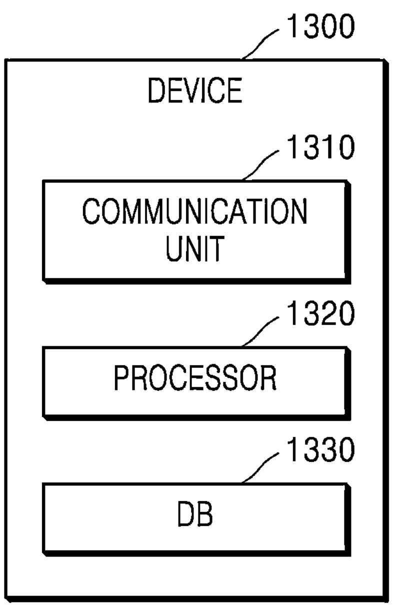
FIG. 13 is a block diagram of an identity authentication request device according to an embodiment of the present disclosure.

FIG. 13 is a block diagram of an identity authentication request device according to an embodiment of the present disclosure.

Referring to FIG. 13, an identity authentication request device 1300 may include a communication unit 1310, a processor 1320, and a database (DB) 1330. In the identity authentication request device 1300 of FIG. 13, only elements related to the embodiment are illustrated. Accordingly, it will be understood by those of ordinary skill in the art that, in addition to the elements illustrated in FIG. 13, other general-purpose elements may be included.

The communication unit 1310 may include one or more elements that enable wired/wireless communication with an external server or an external device. For example, the communication unit 1310 may include at least one of a short-range communication unit (not shown), a mobile communication unit (not shown), and a broadcasting reception unit (not shown).

The DB 1330 is hardware that stores various data processed within the identity authentication request device 1300, and may store a program for processing and control by the processor 1320. The DB 1330 may store payment information, user information, etc.

The DB 1330 may include random access memory (RAM) (e.g., dynamic random access memory (DRAM), static random access memory (SRAM), etc.), read-only memory (ROM), electrically erasable programmable read-only memory (EEPROM), compact-disc read-only memory (CD-ROM), Blu-ray or other optical disk storage, hard disk drive (HDD), solid state drive (SSD), or flash memory.

The processor 1320 controls the overall operation of the identity authentication request device 1300. For example, the processor 1320 may execute programs stored in the DB 1330 to perform overall control on an input unit (not shown), a display (not shown), the communication unit 1310, the DB 1330, etc. The processor 1320 may execute the programs stored in the DB 1330 to control the operation of the identity authentication request device 1300.

The processor 1320 may control at least a part of the operation of the identity authentication request device 1300 described with reference to FIGS. 1 to 12.

The processor 1320 includes at least one of ASICs, DSPs, DSPDs, PLDs, FPGAS, controllers, micro-controllers, microprocessors, or other electrical units for performing functions.

In an embodiment, the identity authentication request device 1300 may be a mobile electronic device. For example, the identity authentication request device 1300 may be implemented as a smartphone, a tablet PC, a PC, a smart TV, a PDA, a laptop, a media player, a navigation system, a device with a camera mounted thereon, and other mobile electronic devices. In addition, the identity authentication request device 1300 may be implemented as a wearable device, such as a watch, glasses, a hair band, or a ring, which has a communication function and a data processing function.

An identity authentication system according to an embodiment of the present disclosure may include an identity authentication request device that collects authentication means data, detects one or more devices, and determines a closest device from among the one or more devices, and a user terminal that transmits stored identity authentication data in response to the determination of the closest device.

In an embodiment, the identity authentication request device may determine whether the authentication means data matches the received identity authentication data.

In an embodiment, the identity authentication request device may calculate the distance to each of the one or more devices and determine the device with the shortest calculated distance as the closest device.

In an embodiment, the calculating of the distance to each of the one or more devices may include transmitting and receiving test data to and from a first device included in the one or more devices, and calculating the distance to the first device, based on the time taken to transmit and receive the test data and the test data propagation speed.

In an embodiment, the transmitting and receiving of the test data may include repeating transmitting the test data to the first device and receiving the test data returned from the first device a preset number of times.

In an embodiment, the system may further include a server, the user terminal may transmit the identity authentication data to the server, and the server may transmit, to the identity authentication request device, the identity authentication data transmitted from the user terminal.

An identity authentication system according to another embodiment of the present disclosure may include an identity authentication request device that collects authentication means data, detects one or more devices, transmits the authentication means data, and determines a closest device from among the one or more devices, a user terminal that transmits an identification number of a dedicated identity authentication device in response to the determination of the closest device, and the dedicated identity authentication device that stores identity authentication data received from the user terminal and determines whether the authentication means data matches the identity authentication data.

In an embodiment, the identity authentication request device may calculate the distance to each of the one or more devices and determine the device with the shortest calculated distance as the closest device.

In an embodiment, the calculating of the distance to each of the one or more devices may include transmitting and receiving test data to and from a first device included in the one or more devices, and calculating the distance to the first device, based on the time taken to transmit and receive the test data and the test data propagation speed.

In an embodiment, the transmitting and receiving of the test data may include repeating transmitting the test data to the first device and receiving the test data returned from the first device a preset number of times.

In an embodiment, the system may further include a server, the identity authentication request device may transmit the collected authentication means data to the server, the user terminal may transmit the identification number of the dedicated identity authentication device to the server, and the server may transmit, to the dedicated identity authentication device, the authentication means data transmitted from the identity authentication request device.

Embodiments according to the present disclosure may be implemented in the form of a computer program that may be executed through various elements on a computer, and such a computer program may be recorded on a computer-readable medium. At this time, the medium may include a magnetic medium such as hard disk, floppy disk, and magnetic tape, an optical recording medium such as CD-ROM and digital versatile disc (DVD), a magneto-optical medium such as floptical disks, and hardware devices specially configured to store and execute program instructions, such as ROM, RAM, and flash memory.

On the other hand, the computer program may be specially designed and configured for the present disclosure or may be known and available to those of ordinary skill in the art of computer software. Examples of the computer program may include not only machine language code generated by a compiler but also high-level language code that is executable using an interpreter or the like by a computer.

According to an embodiment, the methods according to various embodiments of the present disclosure may be provided by being included in a computer program product. The computer program product may be traded between a seller and a buyer as commodities. The computer program product may be distributed in the form of a machine-readable storage medium (e.g., compact disc read only memory (CD-ROM)), or may be distributed (e.g., downloaded or uploaded) online, either via an application store (e.g., Play Store™) or directly between two user devices. In the case of the online distribution, at least part of the computer program product may be stored at least temporarily on a machine-readable storage medium, such as a server of a manufacturer, a server of an application store, or a memory of a relay server, or may be temporarily generated.

Operations constituting methods according to the present disclosure may be performed in any suitable order unless otherwise indicated herein or otherwise clearly contradicted by context. The present disclosure is not necessarily limited by the order of operations. The use of any and all examples or exemplary terms (e.g., "such as") provided herein is simply intended to describe the present disclosure in detail, and the scope of the present disclosure is not limited by the examples or exemplary terms unless otherwise claimed. In addition, it will be understood by those of ordinary skill in the art that various modifications, combinations and changes may be made according to design conditions and factors within the scope of the appended claims or equivalents thereof.

Therefore, it will be understood that the spirit of the present disclosure should not be limited to the embodiments described above, and the claims and all equivalent modifications fall within the scope of the present disclosure.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. An identity authentication request method comprising the steps of:

collecting authentication means data;

switching ON an automatic connection function for connecting communication with other devices, in response to collecting the authentication means data, and detecting one or more devices;

transmitting and receiving test data to and from each of the one or more devices;

calculating a distance for each of the one or more devices based on a time taken to transmit and receive the test data and a test data propagation speed;

determining a closest device from among the one or more devices, as the device with a shortest calculated distance;

requesting device identification data to the closest device;

receiving the device identification data from the closest device;

transmitting the authentication means data to a device identified by the device identification data; and deleting a history of detecting the one or more devices and disconnecting all connections with the one or more devices.

2. The identity authentication request method of claim 1, wherein the step of transmitting and receiving of the test data comprises the steps of:

repeating transmitting the test data to the first device; and receiving the test data returned from the first device a preset number of times.

3. The identity authentication request method of claim 1, wherein the test data is transmitted through a first node and a second node, and the step of calculating the distance to the first device comprises the steps of:

calculating a first distance between the first node and the first device and a second distance between the second node and the first device; and calculating the distance to the first device, based on a distance between the first node and the second node, the first distance, and the second distance.

4. The identity authentication request method of claim 1, wherein the one or more devices are a device that has a record of being paired through a specific communication scheme in the past, and the step of detecting the one or more devices comprises the step of:

detecting the one or more devices through the specific communication scheme.

5. The identity authentication request method of claim 1, wherein the step of transmitting the authentication means data to a device identified by the device identification data comprises the step of:

transmitting the authentication means data to the device identified by the device identification data through a server.

6. The identity authentication request method of claim 1, further comprising the steps of:

receiving success or failure of identity authentication; and approving or disapproving access to a restricted procedure through identity authentication, based on the success or failure of the identity authentication.

7. An identity authentication request device comprising:

a memory in which at least one program is stored; and a processor configured to be operated by executing the at least one program, wherein the processor is further configured to:

collect authentication means data;

switch ON an automatic connection function for connecting communication with other devices, in response to collecting the authentication means data, and detect one or more devices;

transmit and receive test data to and from each of the one or more devices;

calculate a distance for each of the one or more devices based on a time taken to transmit and receive the test data and a test data propagation speed;

determine a closest device from among the one or more devices, as the device with a shortest calculated distance;

request device identification data to the closest device;

receive the device identification data from the closest device;

transmit the authentication means data to a device identified by the device identification data; and delete a history of detecting the one or more devices and disconnect all connections with the one or more devices.

8. A computer-readable recording medium having recorded thereon a program for causing a computer to perform the steps of:

collecting authentication means data;

switching ON an automatic connection function for connecting communication with other devices, in response to collecting the authentication means data, and detecting one or more devices;

transmitting and receiving test data to and from each of the one or more devices;

calculating a distance for each of the one or more devices based on a time taken to transmit and receive the test data and a test data propagation speed;

determining a closest device from among the one or more devices, as the device with a shortest calculated distance;

requesting device identification data to the closest device;

receiving the device identification data from the closest device;

transmitting the authentication means data to a device identified by the device identification data; and deleting a history of detecting the one or more devices and disconnecting all connections with the one or more devices.

* * * * *